(12) United States Patent
Maki et al.

(10) Patent No.: US 8,032,729 B2
(45) Date of Patent: Oct. 4, 2011

(54) COMPUTER SYSTEM AND MANAGEMENT METHOD FOR THE TRANSFER AND REPLICATION OF DATA AMONG SEVERAL STORAGE DEVICES

(75) Inventors: Nobuhiro Maki, Yokohama (JP); Yuri Hiraiwa, Sagamihara (JP); Katsuhisa Miyata, Yokohama (JP); Masahide Sato, Noda (JP)

(73) Assignee: Hitachi, Ltd., Tokyo (JP)

( * ) Notice: Subject to any disclaimer, the term of this patent is extended or adjusted under 35 U.S.C. 154(b) by 192 days.

(21) Appl. No.: 11/250,367

(22) Filed: Oct. 17, 2005

(65) Prior Publication Data
US 2006/0036825 A1  Feb. 16, 2006

(30) Foreign Application Priority Data
Apr. 28, 2005 (JP) ................... 2005-130732

(51) Int. Cl.
*G06F 12/00* (2006.01)
*G06F 13/00* (2006.01)
(52) U.S. Cl. ......... 711/170; 711/100; 711/111; 711/154
(58) Field of Classification Search .................. 711/100, 711/111, 112, 114, 154, 170
See application file for complete search history.

(56) References Cited

U.S. PATENT DOCUMENTS

| | | | |
|---|---|---|---|
| 5,170,480 A | 12/1992 | Mohan et al. | |
| 5,403,639 A | 4/1995 | Belsan et al. | |
| 6,209,002 B1 | 3/2001 | Gagne et al. | |
| 6,324,654 B1 | 11/2001 | Wahl et al. | |
| 6,408,370 B2 | 6/2002 | Yamamoto et al. | |
| 6,502,205 B1 * | 12/2002 | Yanai et al. | 714/7 |
| 6,754,792 B2 | 6/2004 | Nakamura et al. | |
| 6,779,058 B2 | 8/2004 | Kishi et al. | |
| 7,761,677 B2 | 7/2010 | Arakawa et al. | |
| 2002/0184463 A1 * | 12/2002 | Arakawa et al. | 711/170 |
| 2004/0267829 A1 | 12/2004 | Hirakawa et al. | |

(Continued)

FOREIGN PATENT DOCUMENTS
EP    1 146 440    10/2001
(Continued)

OTHER PUBLICATIONS

Sanrad Application Note: Data Migration Solution Transferring Data Between Storage Systems over Fibre-channel or SCSI connections, copyright Sanrad 2003, 9 pages.

*Primary Examiner* — Tuan V. Thai
(74) *Attorney, Agent, or Firm* — Antonelli, Terry, Stout & Kraus, LLP.

(57) ABSTRACT

Transfer of data and replication of data among several storage devices are executed without imposing a load on the computer connected to the storage system. For example, a first host computer monitors usage rates of transfer groups TG11, TG12 and physical path usage rate on a storage device interconnect physical path 50, and when either a usage rate or physical path usage rate goes above a predetermined value, issues to the first storage device 20 an instruction to allocate a reserved volume R11, R12. The first host adaptor 21 receiving the reserved volume R11, R12 allocation request allocates reserved volume R11 to transfer group TG1, whereby a virtual transfer volume is formed by transfer volume T11 and the reserved volume R11 allocated thereto. Capacity of the virtual transfer volume is increased by the equivalent of the reserved volume R11 capacity, so that additional transfer frames may be stored.

4 Claims, 21 Drawing Sheets

U.S. PATENT DOCUMENTS

2005/0071393 A1 3/2005 Ohno et al.

FOREIGN PATENT DOCUMENTS

| | | |
|---|---|---|
| EP | 1 548 594 | 6/2005 |
| JP | 11-085408 | 3/1999 |
| JP | 2000-181634 | 6/2000 |
| JP | 2000-259505 | 9/2000 |
| JP | 2002-189570 | 7/2002 |
| JP | 2002-278819 | 9/2002 |
| JP | 2003-526156 | 9/2003 |
| JP | 2003-296039 | 10/2003 |
| JP | 2004-13367 | 1/2004 |
| WO | WO 01/67247 | 9/2001 |

* cited by examiner

Fig.5

| Logical volume no. | Volume status | Format | Capacity | Pair No. | Physical address ||
|---|---|---|---|---|---|---|
| | | | | | HDD No. | Location from lead |
| 1 | Primary | OPEN3 | 3 | 1 | 1 | 0 |
| 2 | Primary | OPEN6 | 6 | 2 | 1 | 3 |
| 3 | Unused | OPEN6 | 6 | 0 | 1 | 9 |
| 4 | Normal | OPEN9 | 9 | 0 | 2 | 0 |
| 5 | Normal | OPEN3 | 3 | 0 | 2 | 9 |
| 6 | Unused | OPEN6 | 6 | 0 | 2 | 12 |

| Pair No. | Pair status | 1st storage device No. | 1st logical volume No. | 2nd storage device No. | 2nd logical volume No. | Group No. | Replicated address |
|---|---|---|---|---|---|---|---|
| 1 | Normal | 1 | 1 | 2 | 1 | 1 | 0 |
| 2 | Normal | 1 | 2 | 2 | 3 | 1 | 0 |
| 3 | Unused | 0 | 0 | 0 | 0 | 0 | 0 |
| 4 | Unused | 0 | 0 | 0 | 0 | 0 | 0 |
| 5 | Unused | 0 | 0 | 0 | 0 | 0 | 0 |

| Group No. | Group status | Pair set | Virtual transfer volume No. | Update information |
|---|---|---|---|---|
| 1 | Normal | 1, 2 | 4 | 1 |
| 2 | Unused | 0 | 0 | 0 |

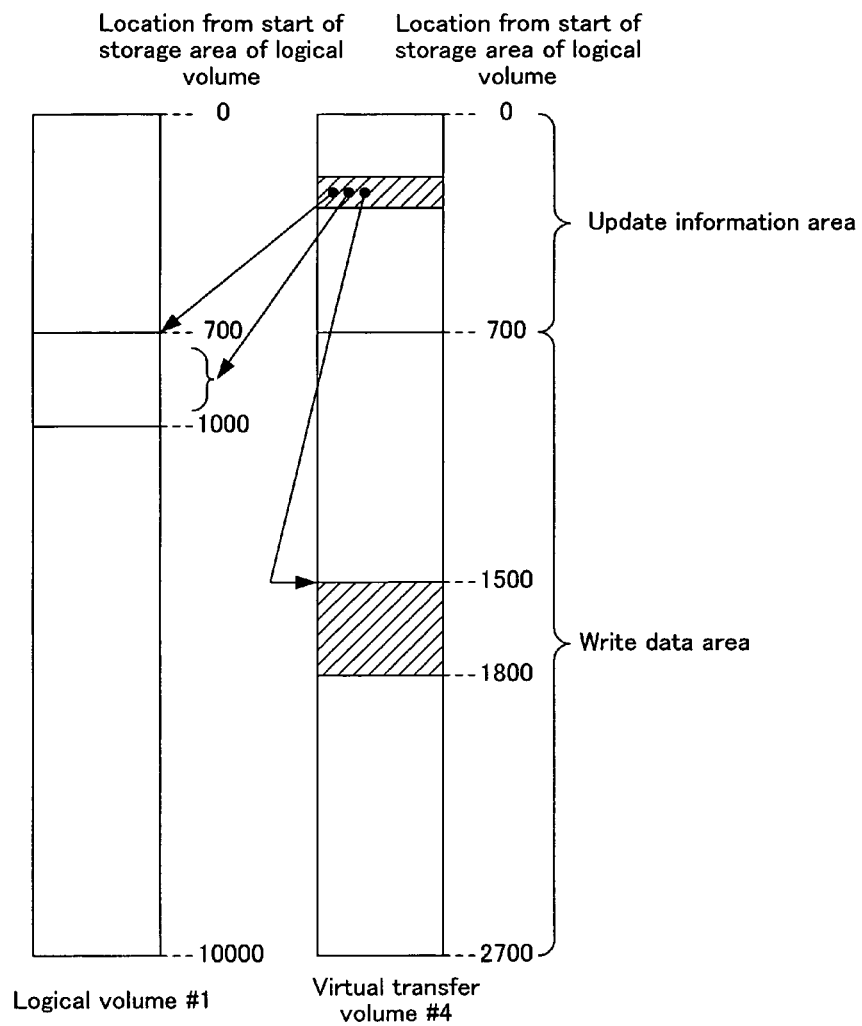

Fig. 9

| Setting | Setting value example |
|---|---|
| Write command receive time | 1999/3/17 22:20:10 |
| Group No. | 1 |
| Update No. | 4 |
| Write command logical address | Logical volume No.: 1<br>Location from start of storage area of logical volume: 700 |
| Data size of write data | 300 |
| Logical address of virtual transfer volume storing write data | Virtual transfer volume No: 4<br>Location from start of storage area of virtual transfer volume: 1500 |

Fig.10

|  | Virtual address | |
|---|---|---|
|  | Virtual volume No. | Location from start of storage area of virtual volume |
| Update information area lead address | 4 | 0 |
| Write data area lead address ADs | 4 | 700 |
| Update information newest address | 4 | 500 |
| Update information oldest address | 4 | 200 |
| Write data newest address ADn | 4 | 2200 |
| Write data oldest address ADo | 4 | 1300 |
| Read start address | 4 | 400 |
| Retry start address | 4 | 300 |
| Write data area end address ADe | 4 | 2700 |

| Group No. | Group usage rate | Usage rate differential |
|---|---|---|
| 1 | 70 | 10 |
| 2 | 30 | 0 |
| 3 | 40 | 40 |

Fig.16

| Reserved volume No. | Allocateed group No. | Registration order |
|---|---|---|
| 1 | 1 | 1 |
| 2 | 1 | 2 |
| 3 | 3 | 1 |
| ... | ... | ... |
| 001A | Free | - |

| Path No. | Physical path usage rate | Path-using group No. |
|---|---|---|
| 1 | 55 | 1 |
| 2 | 77 | 2, 3 |

COMPUTER SYSTEM AND MANAGEMENT METHOD FOR THE TRANSFER AND REPLICATION OF DATA AMONG SEVERAL STORAGE DEVICES

This application claims the benefit of priority of U.S. patent application Ser. No. 10/899,158 filed on Jul. 27, 2004, and Japanese Patent Applications No. 2005-130732 filed on Apr. 28, 2005 and No. 2004-140654 filed on May 11, 2004, the disclosure of which are also entirely incorporated herein by reference.

BACKGROUND

The present invention relates generally to a computer system composed of computers and storage devices, and relates in particular to a replicate data transfer technique for a computer system.

In conventional computer systems, when replicate data is transferred from a first storage device connected to a first computer to a second storage device connected to a second computer, transfer of the replicated data takes place via a physical path connecting the first computer and second computer together.

SUMMARY

However, the principal processes required of the first computer in a computer system of the above kind are computation processes and computation result (data) write processes to the first storage device. As noted, it is necessary on the other hand to ensure security of data stored in the first storage device by means of writing to the second storage device of the second computer replicate data, which is a copy of data stored in the first storage device of the first computer. Accordingly, a higher processing load is imposed on the first computer, and in the event that processing capacity reaches saturation, there is a risk that the entire computer system may go down.

Writing of data from the first computer to the first storage device takes place via a physical path connecting the first computer with the first storage device, and reading of replicate data of data stored in the first storage device also takes place via this physical path. Accordingly, data transmission associated with data write operations and data transmission associated with replicate data read operations can interfere with one another, posing the risk of taking a longer time when the first computer needs to refer to data or update data in the first storage device.

The aspects described hereinbelow are directed to addressing this problem at least in part, and have as an object to carry out data transfer and data replication among a plurality of storage devices, without imposing a load on the computers connected to the storage system.

A first aspect for addressing the aforementioned problem provides a computer system comprising a first computer; a first storage device for storing data transmitted from said first computer; and a second storage device for storing replicate data of data stored in said first storage device.

The computer system pertaining to this first aspect is characterized in that said first storage device comprises: a memory module comprising a data storage area for storing data transmitted from said first computer, a transfer data storage area for storing transfer data for transfer to said second storage device, said transfer data consisting of replicate data of data stored in said data storage area, and a reserved area dynamically allocatable to said transfer data storage area; and a reserved area control module for allocating and unallocating said reserved area with respect to said transfer data storage area; and said first computer comprises an instruction issuing module for issuing to said reserved area control module of said first storage device an instruction to execute allocation or unallocation of said reservation.

According to the computer system of the first aspect, the first storage device comprises a reserved area control module for allocating and unallocating a reserved area that is dynamically allocatable with respect to the transfer data storage area; and the first computer issues to said reserved area control module an instruction to allocate or unallocate a reservation, whereby it becomes possible to carry out data transfer and data replication among a plurality of storage devices without imposing a load on the computers connected to the storage system. Further, interruption of data transfer or data replication among a plurality of storage devices due to insufficient capacity in the transfer data storage area can be controlled or avoided.

A second aspect provides a storage system. The storage system pertaining to this second aspect is characterized by comprising: a first storage device that comprises a first memory module comprising a data storage area for storing data, a transfer data storage area for storing data for transfer to said second storage device, and a reserved area dynamically allocatable to said transfer data storage area; a first execute instruction receiving module for receiving an execute instruction to allocate or unallocate said reserved area with respect to said transfer data storage area; a first reserved area managing module for executing allocation or unallocation of said reserved area with respect to said transfer data storage area, according to said received execute instruction; and a first sending/receiving module for sending and receiving data to and from said second storage device; a second storage device that comprises a second memory module comprising a data storage area for storing data, a transfer data storage area for storing data transferred from said first storage device, and a reserved area allocatable to said transfer data storage area; a second execute instruction receiving module for receiving an execute instruction to allocate or unallocate said reserved area with respect to said transfer data storage area; a second reserved area managing module for executing allocation or unallocation of said reserved area with respect to said transfer data storage area; and a second sending/receiving module for sending and receiving data to and from said first storage device; and a physical communication path connecting said first sending/receiving module with said second sending/receiving module.

According to the storage system of the second aspect, the first storage device comprises a reserved area managing module for executing allocation or unallocation of the reserved area with respect to the transfer data storage area, according to an execute instruction to allocate or unallocate the reserved area with respect to the transfer data storage area; and the second storage device comprises a second reserved area managing module for executing allocation or unallocation of the reserved area with respect to the transfer data storage area, according to an execute instruction to allocate or unallocate the reserved area with respect to the transfer data storage area, whereby execution of data transfer and data replication between the first and second storage devices without imposing any load on computers connected to the storage system. Further, interruption of data transfer or data replication between the first and second storage devices due to insufficient capacity in the transfer data storage area of either the first or second storage device can be controlled or avoided.

A third aspect provides a storage device connected to a computer. The storage device pertaining to the third aspect is characterized by comprising: a communication managing device for managing communication with said computer; a data storage portion for storing data; a transfer data storage portion for storing replicate data for transfer to another storage device; a backup data storage portion dynamically allocatable to said transfer data storage portion; a read/write control module for controlling reading/writing of data to and from said transfer data storage portion; and a managing module for allocating or unallocating said backup data storage portion with respect to said transfer data storage area.

According to the storage device of the third aspect, since there is provided a managing module for allocating or unallocating the backup data storage portion with respect to the transfer data storage area, data transfer and data replication among a plurality of storage devices can be executed without imposing any load on computers connected to storage devices. Further, interruption of data transfer or data replication among a plurality of storage devices due to insufficient capacity in the transfer data storage area can be controlled or avoided.

A fourth aspect provides a management method of a storage system, said system comprising a storage device comprising a data storage area for storing data, a transfer data storage area for storing transfer data for transfer to another storage device, said transfer data consisting of replicate data of data stored in said data storage area, and a reserved area dynamically allocatable to said transfer data storage area.

The management method of a storage system pertaining to the fourth aspect is characterized in that usage rate of a said transfer data storage area in said storage device is acquired; in the event that said acquired usage rate exceeds a predetermined level, a determination is made as to whether an empty said reserved area is available; and in the event that an empty said reserved area is available, allocation of said reserved area to said transfer data storage area is executed.

According to the management method of a storage system pertaining to the fourth aspect, usage rate of a transfer data storage area in the storage device is acquired; in the event that acquired usage rate exceeds a predetermined level, a determination is made as to whether an empty reserved area is available; and in the event that an empty reserved area is available, allocation of the reserved area to the transfer data storage area is executed, whereby data transfer and data replication among a plurality of storage devices can be executed without imposing any load on computers connected to the storage system. Further, interruption of data transfer or data replication among a plurality of storage devices due to insufficient capacity in the transfer data storage area can be controlled or avoided.

A fifth aspect [of the invention] provides a manipulating device for managing and manipulating the operating status of a storage device in a computer system that comprises a computer and said storage device, said storage device comprising a data storage area for storing data transmitted from said computer, a transfer data storage area for storing transfer data for transfer to another storage device, said transfer data consisting of replicate data of data stored in said data storage area, and a reserved area dynamically allocatable to said transfer data storage area.

The manipulating device pertaining to the fifth aspect is characterized by comprising a physical communication path connected to said storage system; a usage status display module for acquiring and displaying the usage status of said transfer data storage area in said storage device via said physical communication path; an allocation status display module for acquiring and displaying the allocation status of said reserved area in said storage device via said physical communication path; an input module for inputting a process to said storage device; and a control signal issuing module for issuing a control signal to said storage device via said physical communication path, in response to the content of a process input via said input module.

A sixth aspect provides a computer system comprising a first host computer; a first storage device for storing data transmitted from said first host computer; a second storage device for storing replicate data of data stored in said first storage device; and a second host computer connected to a second storage device.

In the sixth aspect, said first storage device comprises: one or a plurality of hard disk drives, [said drive] comprising one or several data storage volumes for storing data transmitted from said first host computer, one or several transfer data storage volumes for storing transfer data for transfer to said second storage device, said transfer data consisting of replicate data of data stored in said one or several data storage volumes, and one or several reserved volumes dynamically allocatable to said one or several transfer data storage volumes; and a host adaptor for executing allocation or unallocation of each said reservation volume in a reserved group formed by said one or several reserved volumes, for one or several transfer groups formed by said one or several data storage volumes and said one or several transfer data storage volumes;

wherein said first host computer comprises a storage control module for issuing to the host adapter of said first storage device an execute instruction to execute allocation or unallocation of said reservation, said storage control module, in the event of change over time in usage of said transfer data storage volume and with the usage ratio representing the ratio of used area to useable area being greater than a predetermined value, issues an execute instruction to allocate said reserved volume to said transfer data storage volume; in the event of no change over time in said usage and with said usage ratio equal to or less than said predetermined value, issues an execute instruction to unallocate said reserved volume from said transfer data storage volume; or in the event of failure to meet either a condition of no change over time in said usage with said usage ratio being equal to or less than said predetermined value, or a condition of change over time in said usage with said usage ratio being greater than said predetermined value, in the further event that the usage rate of the physical communication path that communicably connects said first storage device and said second storage system is equal to or greater than a predetermined level, issues an execute instruction to allocate said reservation volume to said transfer data storage volume, or in the event that said usage rate is below a predetermined level, issues an execute instruction to unallocate said reservation volume from said transfer data storage volume.

Said second storage device comprises: a hard disk drive comprising one or several transfer data storage volumes for storing said replicate data transmitted from said first storage device, one or several data storage volumes for storing said replicate data stored in said one or several transfer data storage volumes, and one or several reserved volumes dynamically allocatable to said one or several transfer data storage volumes; and a host adaptor for executing allocation or unallocation of each said reservation volume in a reserved group formed by said one or several reserved volumes, for one or several transfer groups formed by said one or several data storage volumes and said one or several transfer data storage volumes; wherein said second host computer comprises a storage control module for instructing the host adapter of said second storage device to execute allocation or unallocation of said reservation, said storage control module, in the event of change over time in usage of said transfer data storage volume and with the usage ratio representing the ratio of used area to useable area being greater than a predetermined value, issues an execute instruction to allocate said reserved volume to said transfer data storage volume; and in the event of no change over time in said usage and with said usage ratio equal to or less than said predetermined value, issues an execute instruction to unallocate said reserved volume from said transfer data storage volume.

According to the computer system pertaining to the sixth aspect, the first and second storage devices comprise a host adaptor for executing allocation or unallocation of a reservation volume dynamically allocatable to a transfer data storage volume, and the first and second host computers issue to the host adaptor an execute instruction to allocate or unallocate reservation, whereby data transfer and data replication among a plurality of storage devices can be executed without imposing any load on computers connected to the storage system. Further, interruption of data transfer or data replication among a plurality of storage devices due to insufficient capacity in the transfer data storage area can be controlled or avoided.

The computer systems pertaining to the first and sixth aspects, the storage systems pertaining to the second and third aspects, and the manipulating device pertaining to the fifth aspect may also be realized as a method, program, or computer-readable recording medium having a program recorded thereon. The method pertaining to the fourth aspect may also be realized as program or computer-readable recording medium having a program recorded thereon.

Other features of the invention will be apparent from the following detailed description and the accompanying drawings.

BRIEF DESCRIPTION OF THE DRAWINGS

FIG. 5 is an illustration of an example of volume information stored in shared memory.

FIG. 6 is an illustration of an example of pair information stored in shared memory.

FIG. 7 is an illustration of an example of group information stored in shared memory.

FIG. 8 is a conceptual illustration of the arrangement of a virtual transfer volume.

FIG. 9 is an illustration of an example of update information stored in the update information area of a virtual transfer volume.

FIG. 10 is an illustration of an example of pointer information stored in shared memory.

FIG. 15 is an illustration of an example of usage rate information including the difference between usage rate and transfer group usage rate.

FIG. 16 is an illustration of an example of reserved volume management information.

FIG. 17 is an illustration of physical path usage rate information.

DETAILED DESCRIPTION OF THE PREFERRED EMBODIMENTS

Following is a description of the computer system and reserved area allocation management method in a computer system on the basis of a embodiment, made with reference to the accompanying drawings.

The following description of a computer system pertaining to the embodiment and the hardware arrangements of the storage devices and host computers making up the computer system is made with reference to FIGS. 1-4.

Figure 1:
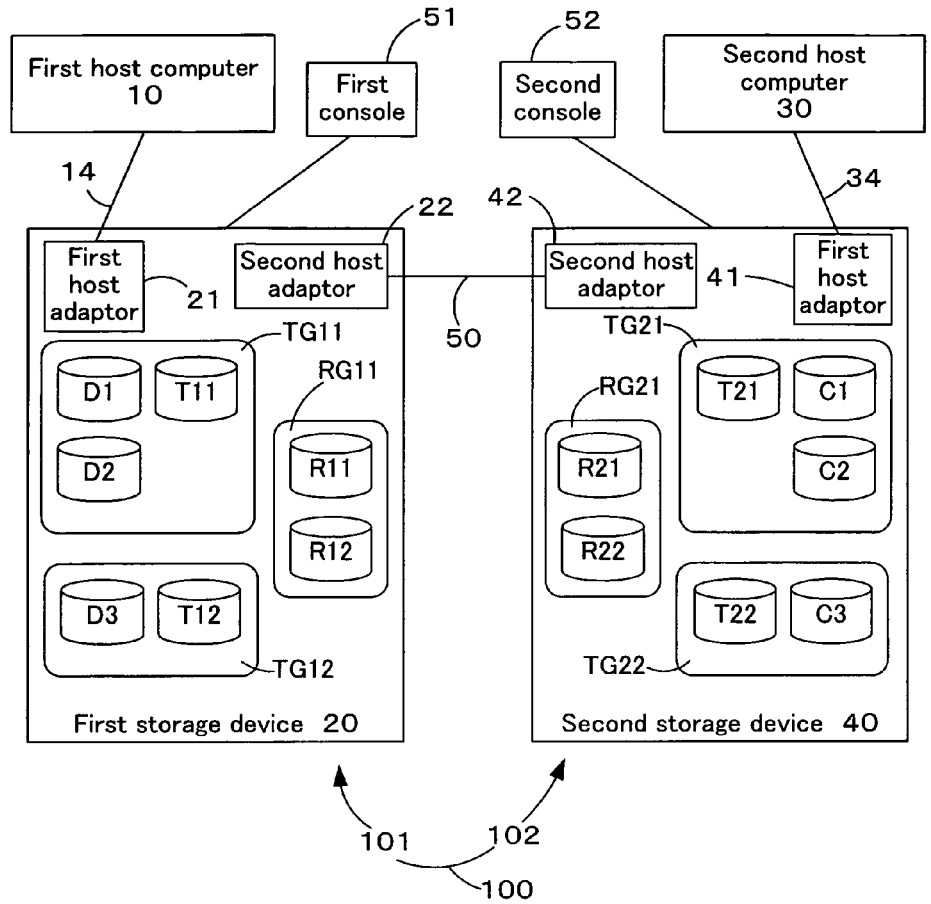
FIG. 1 is an illustration showing a simplified arrangement of a computer system pertaining to the embodiment.
Figure 2:
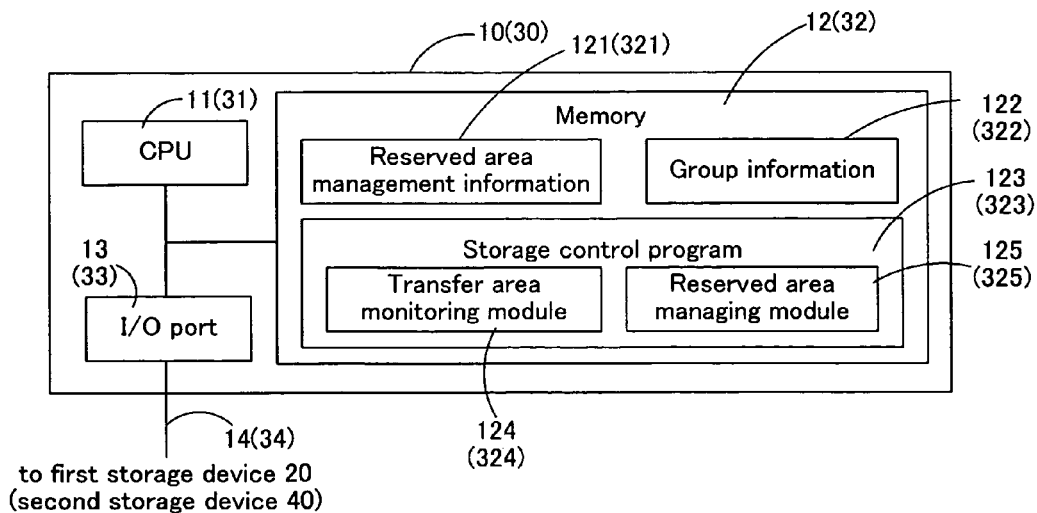
FIG. 2 is a block diagram showing the internal arrangement of the first host computer in the embodiment.
Figure 3:
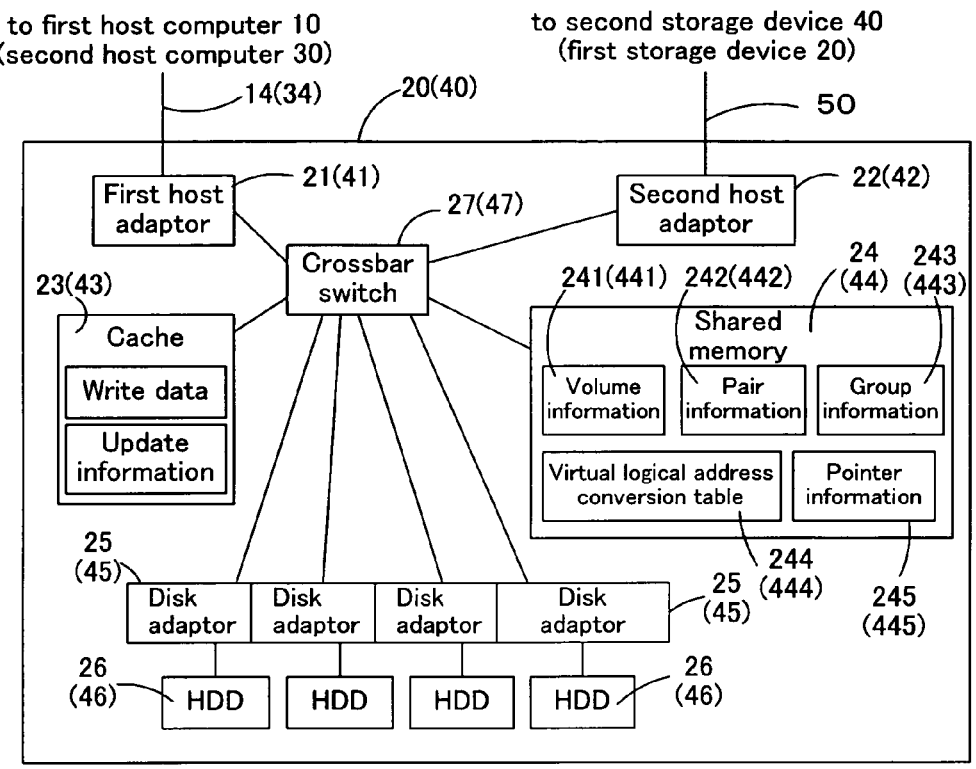
FIG. 3 is a block diagram showing the internal arrangement of the first storage device in the embodiment.
Figure 4:
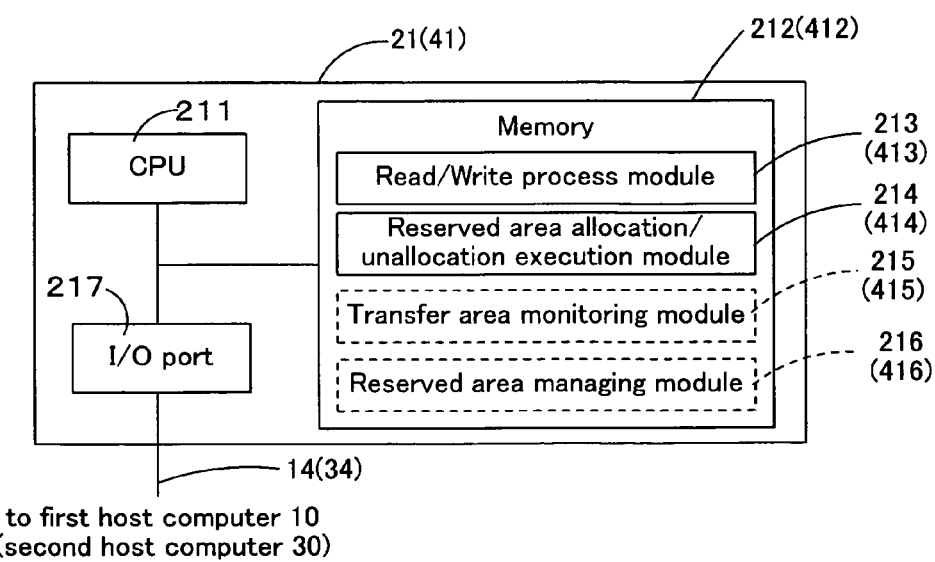
FIG. 4 is a block diagram showing the internal arrangement of the first host adaptor making up the first storage device in the embodiment.

FIG. 1 is an illustration showing a simplified arrangement of a computer system pertaining to the embodiment. FIG. 2 is a block diagram showing the internal arrangement of the first host computer in the embodiment. FIG. 3 is a block diagram showing the internal arrangement of the first storage device in the embodiment. FIG. 4 is a block diagram showing the internal arrangement of the first host adaptor making up the first storage device in the embodiment.

Computer system 100 comprises a first computer system 101 comprising a first host computer 10 and a first storage device 20; and a second computer system 102 comprising a second host computer 30 and a second storage device 40. The first storage device 20 and second storage device 40 are connected via a storage device interconnect physical path 50 to form a storage system. That is, in the embodiment, a system composed of several storage devices is referred to as a storage system. There may be additionally connected to the first storage device 20 and second storage device 40 respectively a first console 51 and second console 52 for the purpose of controlling operating and managing status of the storage devices 20, 40. Typically, the first computer system 101 stores data resulting from operations executed by the first host computer 10, while the second computer system 102 stores replicate data (transfer frames) of data being stored in the first computer system 101. Accordingly, the first computer system 101 shall in some instances be referred to as the primary computer system 101 (primary host computer, primary storage device), and the second computer system 102 shall in some instances be referred to as the auxiliary computer system 102 (auxiliary host computer, auxiliary storage device).

The first host computer 10 is connected to the first storage device 20 via a signal physical path 14. Data resulting from operations executed in the first host computer 10 is transmitted to the first storage device 20 via signal physical path 14, and is stored there. As shown in FIG. 2, the first host computer 10 comprises a central processing unit (CPU) 11 as the processor for executing various operation processes, memory 12, and an I/O port 13 for executing sending and receiving of data and commands to and from the first storage device 20. Memory 12 stores various application programs for execution by CPU 11, reserved area management information 121, group information 122, and a storage control program 123 for controlling data storage and transfer in the first storage device 20. The storage control program 123 is a program for controlling the first storage device 20, and includes, for example, a transfer area monitoring module 124 for monitoring usage of transfer areas (transfer volumes), and a reserved area managing module 125 for determining allocation and unallocation of reserved areas (reserved volumes) in the storage device 20.

The second host computer 30 is furnished with a design analogous to that of the first host computer 10, and will be allocated the same symbols as in FIG. 1, without further description.

The following description of the storage area provided in the first storage device 20 makes reference to FIG. 1 and FIG. 3. As shown in FIG. 3, while the first storage device 20 is physically comprised of several HDD 26, these form a signal logical storage area overall, and are further partitioned into a number of logical volumes. As shown in FIG. 1, logical volumes form data storage volumes D1, D2, D3 and transfer data storage volumes T11, T12. Data storage volumes D1, D2 and transfer data storage volume T11 together form a first transfer group TG11, while data storage volume D3 and transfer data storage volume T12 together form a second transfer group TG12.

The first storage device 20 in the embodiment additionally utilizes some of the logical volumes as reserved volumes R11, R12. The reserved volumes R11, R12 together form a reserved group RG11. The reserved volumes R11, R12 are logical volumes that, depending on usage of the transfer data storage volumes T11, T12, are allocatable on a temporary basis as transfer data storage volumes to transfer groups TG11, TG12. More specifically, reserved volumes R11, R12 are allocated to transfer data storage volumes whose usage rate reaches or goes above a certain predetermined level. In the embodiment, logical volumes composed of a plurality of transfer data storage volumes, or one or several transfer data storage volumes with a reserved volume, are referred to as "virtual transfer volumes." An allocated reserved volume is subsequently unallocated when the usage rate of the transfer data storage volume goes below a predetermined level. In FIG. 1, logical volumes are shown conceptually in order to facilitate description.

Similarly, the second storage device 40 also has a storage area composed of a plurality of logical volumes. As shown in FIG. 1, for example, the logical volumes form replicate data storage volumes C1, C2, C3 and transfer data storage volumes T21, T22. Replicate data storage volumes C1, C2 and transfer data storage volume T21 together form a first transfer group TG21, while replicate data storage volume C3 and transfer data storage volume T22 together form a second transfer group TG22.

The second storage device 40 of the embodiment additionally utilizes some of the logical volumes as reserved volumes R21, R22. The reserved volumes R21, R22 together form a reserved group RG21. The reserved volumes R21, R22 are logical volumes that, depending on usage of the transfer data storage volumes T21, T22, are allocatable on a temporary basis as transfer data storage volumes to transfer groups TG21, TG22. As with reserved volumes R11, R12, reserved volumes R21, 22 are allocated to or unallocated from transfer data storage volumes T21, T22.

Capacity of each logical volume and physical storage location within storage device 20 (physical address) can be specified by means of a number identifying an HDD 26 (HDD number) within the storage device 20 and a number that uniquely identifies a storage area within the HDD 26, for example, location from the start of the HDD storage area. The physical address used when the first host computer 10 refers to or updates data stored in the first storage device 20 is defined by a number identifying the logical volume (logical volume number) and a number that uniquely identifies a storage area within the logical volume, for example, location from the start of the logical volume. Accordingly, writing to and reading from a physical address of an HDD 26 is executed by means of converting a logical address specified by the first host computer 10 into a physical address. Physical addresses in logical volumes are kept as volume information, described in detail later.

The management unit termed a "group," which is composed of one or several logical volumes, is used for the purpose of retaining the update order of data in among the logical volumes. That is, in the event that there are several data storage volumes to which are written write data transmitted from the first host computer 10, as with data storage volumes D1 and D2 in the first storage device 20, it is required that the order of updating (writing to) the data storage volumes D1 and D2 in the first storage device 20 conform with the order of updating the replicate data storage volumes C1, C2 in the second storage device 40. By registering within a same given group logical volumes for which the update order of data must be preserved, and allocating group information update numbers on a per-data update basis, replicate data write processes to the second storage device 40 are carried out in update number order.

The following description of the arrangement of the first storage device 20 makes reference to FIG. 1 and FIG. 3. The first storage device 20 comprises a first host adaptor 21, a second host adaptor 22, a cache 23, shared memory 24, a plurality of disk adaptors 25, a plurality of hard disk drives (HDD) 26, and a crossbar switch 27. Elements 21-25 are selectively connected by means of crossbar switch 27.

The first host adaptor executes control of data transfers between the first host computer 10 and cache memory, and operational control of the first storage device 20 as a whole. As shown in FIG. 4, the first host adaptor 21 comprises a CPU 211 for executing operations of various kinds, memory 212, and an I/O port 217 for executing sending and receiving of data and commands to and from the first host computer 10. Memory 212 comprises a read/write process module 213 for executing read and write processes to HDD 26, and a reserved area allocation/unallocation execution module 214 for executing allocation and unallocation of reserved volumes with respect to transfer volumes, in accordance with commands from the host computer 10. Where the first storage device 20 comprises a reserved area managing module and transfer area monitoring module executed by means of the first host computer 10, memory 212 may additionally comprise a transfer area monitoring module 215 for monitoring usage of transfer areas (transfer volumes) in the storage device 20, and a reserved area managing module 216 for determining allocation and unallocation of reserved areas (reserved volumes) in the storage device 20.

The second host adaptor 22 executes control of sending and receiving of data and commands to and from the second storage device 40. Just like the first host adaptor 21, the second host adaptor 22 comprises a CPU, memory, and I/O port.

Cache 23 temporarily stores write data sent by the first host computer 10 and data read from HDD 26, as well as storing update information for managing write data.

Shared memory 24 is memory that is shared by the first and second host adaptors 21, 22 and disk adaptor 25, and stores information of various kinds, namely, volume information 241, pair information 242, group information 243, a virtual logical address conversion table 244, and pointer information 245, described later.

A disk adaptor 25 is provided for each HDD 26 for controlling writing of data to HDD 26 and reading of data from HDD 26. Just like the first host adaptor 21, the disk adaptor 25 comprises a CPU, memory, and I/O port.

The second storage device 40 has a configuration analogous to that of the first storage device 20 and will be allocated the same symbols as in FIG. 3 and FIG. 4, without further description.

A brief description of the second computer system 102 now follows. The second computer system 102 comprises a second host computer 30 and second storage device 40 connected via a signal physical path 24. A second console 52 is connected to the second storage device 40. As noted previously, the second host computer 30 has a configuration analogous to that of the first host computer 10, and the second storage device 40 has a configuration similar to that of the first storage device 20, with the exception of the logical volume arrangement of the storage area.

Figure 11:
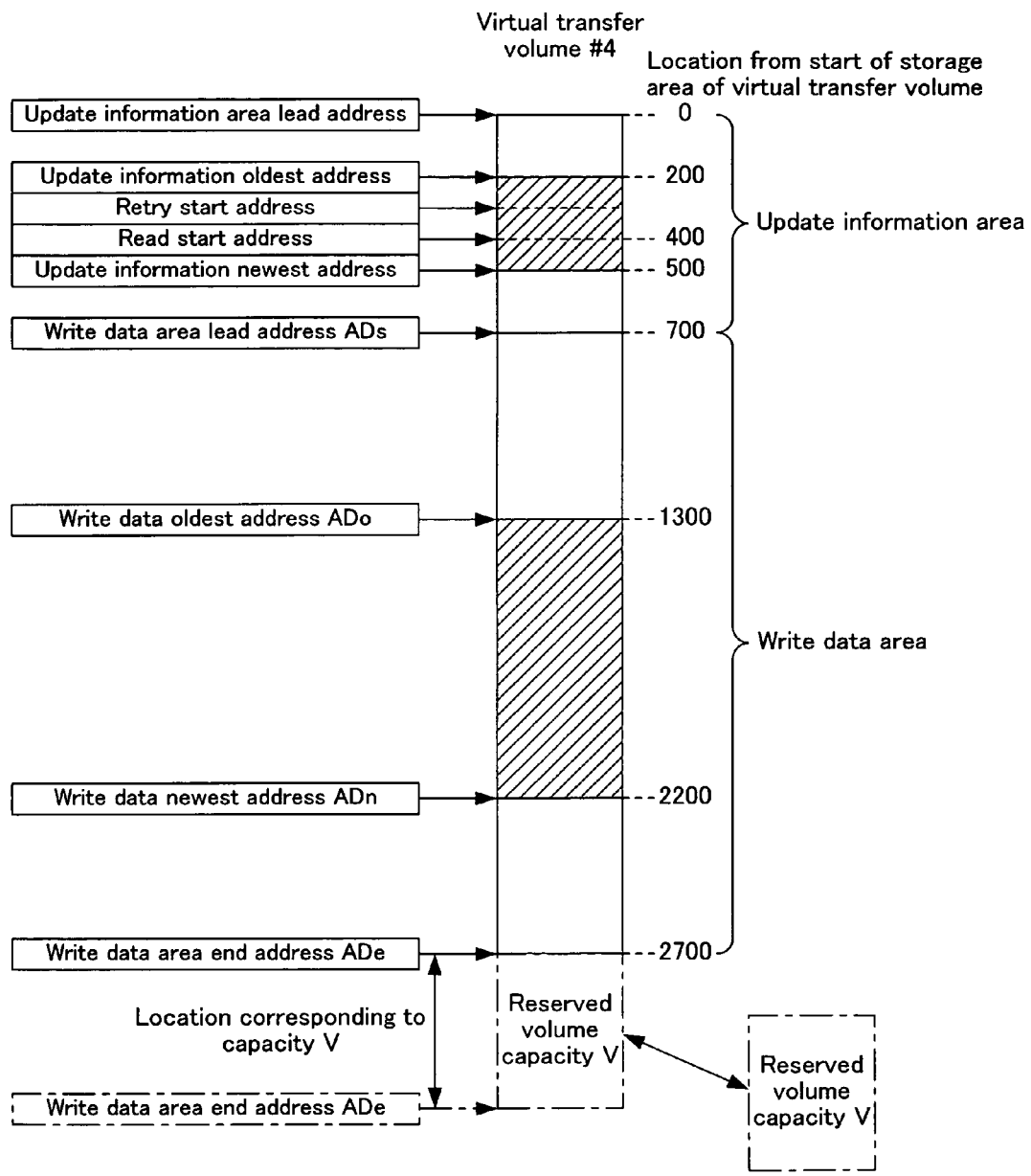
FIG. 11 is a conceptual illustration of address locations in a virtual transfer volume.

Referring now to FIG. 5-FIG. 11, the various types of information stored in the shared memory 24 of the first storage device 20 will be described. FIG. 5 is an illustration of an example of volume information stored 241 in shared memory 24. FIG. 6 is an illustration of an example of pair information 242 stored in shared memory 24. FIG. 7 is an illustration of an example of group information 243 stored in shared memory 24. FIG. 8 is a conceptual illustration of the arrangement of a virtual transfer volume. FIG. 9 is an illustration of an example of update information stored in the update information area of a virtual transfer volume. FIG. 10 is an illustration of an example of pointer information 244 stored in shared memory 24. FIG. 11 is a conceptual illustration of address locations in a virtual transfer volume.

Volume information 241 is information used for managing logical volumes, and includes, for each logical volume, the volume status, format, capacity, pair number, and physical address. Volume status may assume a value of normal, primary, auxiliary, abnormal, or unused. Where volume status is normal or primary, this indicates that the logical volume can be accessed normally by the host computer 10. Where volume status is primary, this indicates that the logical volume is one in which replication of data is carried out. Where volume status is auxiliary, this indicates that access to the logical volume by host computer 10 may be permitted, and that the logical volume used for replication. Where volume status is abnormal, this indicates that the logical volume cannot be accessed normally by the host computer 10. For example, failure due to malfunction of the HDD 26 containing the logical volume would fall into this category. Where volume status is abnormal, this indicates that the logical volume is not being used. Pair number includes a pair number indicating pair information 242 valid for logical volumes having volume status of primary or auxiliary. In FIG. 8, for example, logical volume 1 has an OPEN3 format, 3 GB capacity, stores data from the beginning of the hard disk, is accessible by host computer 10, and is targeted for data replication.

Pair information 242 is information for the purpose of managing logical volumes that constitute a pair; as shown in FIG. 9, it includes pair status, first (primary) storage device number, first (primary) logical volume number, second (auxiliary) storage device number, second (auxiliary) logical volume number, group number, and replicated address. Pair status may assume a value of normal, abnormal, unused, unreplicated, or replicating. Where pair status is normal, this indicates that replication of the first logical volume is carried out normally. Where pair status is abnormal, this indicates that replication of the first logical volume cannot be carried out, for example, because of a failure due to a break on the storage device interconnect physical path 50. Where pair status is unused, this indicates that information for the pair number is not valid. Where pair status is replicating, this indicates that the initial replication process, described later, is in process. Where pair status is unreplicated, this indicates that the initial replication process has not yet been executed.

The first storage device number is a number that identifies the first storage device 20 having the first logical volume. The second storage device number is a number that identifies the second storage device 40 having the second logical volume. Group number indicates the number of a group to which the first logical volume belongs (in the case of the first storage device 20) or the number of a group to which the second logical volume belongs (in the case of the second storage device 40). Replicated address indicates capacity of replicate data created for transfer, and has an initial value of 0. In FIG. 9, for example, pair 1 in the pair information indicates that the data replication destination (replicate data, transfer frame transfer destination) is the second logical volume 1 of the second storage device 2, and that the data replication process has been carried out normally.

Group information 343 is information for purpose of managing groups; as shown in FIG. 10, it includes group status, pair information, virtual transfer volume number, and update number. Group status may assume a value of normal, abnormal, or unused. Where group status is normal, this indicates that pair status is normal for at least one pair in the pair set. Where group status is abnormal, this indicates that all pairs in the pair set are abnormal. Where group status is unused, this indicates that information for the group number is not valid. Pair set indicates, in the case of the first storage device 20, all of the pair numbers of all of the first logical volumes belonging to the group indicated by the group number. In the case of the second storage device 40, it indicates all of the pair numbers of all of the second logical volumes belonging to the group indicated by the group number. Virtual transfer logical volume number indicates the number of the virtual transfer logical volume belonging to the group indicated by the group number. Here, virtual transfer logical volume refers to a hypothetical transfer volume formed for the purpose of handling a plurality of transfer volumes in a transfer group as a single volume. Update number assumes an initial value of 1, and is incremented by 1 each time that data is written to a first logical volume in the group. In FIG. 10, for example, it is indicated Group 1 is composed of first logical volumes 1, 2 from pair information of pairs 1, 2, and a virtual transfer volume 4, and that the data replication process has been carried out normally.

The following description of virtual transfer volume configuration and logical volume (data storage volume) relationships makes reference to FIG. 8 and FIG. 9. A virtual transfer volume is composed of an update information storage area for storing update information, and a write data storage area for storing write data. As shown in FIG. 9, update information includes a write command which is information for the purpose of managing write data, a group number, an update number for group information 243, a write command logical address, data size of the write data, and the logical address of the virtual transfer volume in which the write data is stored. In the example of FIG. 9, update information has been created by a write command received at 22:20:10 on Mar. 17, 1993. The received write command instructs that write data of a data size of 30 be stored at location 700 from the start of the storage area of the logical volume having the logical volume 1. The storage location for the write data in the virtual transfer volume is the location 1500-1800 from the start location of the storage area in the virtual transfer volume. The update information indicates that this logical volume belongs to group 1, and that this is the fourth data update since commencing replication of data of group 1.

Pointer information 245 is retained on a group-by-group basis, and is information for managing transfer volumes of a group in question; as shown in FIG. 10, it includes update information area lead address, write data area lead address, update information newest address, update information oldest address, write data newest address, write data oldest address, read start address, retry start address, and write data area end address. These addresses are virtual addresses indicating memory locations in a virtual transfer volume consisting of one or several logical volumes, and are converted to logical addresses in logical volumes, using the virtual logical address conversion information 244 described later. A virtual address is designated by the number of the virtual transfer volume and the storage area lead location in the virtual transfer volume.

As shown in FIG. 11, update information is stored in an area extending from the update information area lead address (0) to the write data area lead address ADs (700). The update information area further comprises an update information oldest address indicating the lead location of the oldest update information, an update information newest address indicating the lead location of the newest update information, a retry start address, and a read start address.

Write data is stored in an area extending from the write data area lead address ADs (700) to the write data area end address ADe (2700). The write data oldest address ADo indicates the storage start location of the oldest write data, and the write data newest address ADn indicates the storage start location of the newest write data. In the example of FIG. 11, update information is stored over a virtual address range of 200-500, and write data is stored over a virtual address range of 1300-2200.

Here, the virtual transfer volume used in the embodiment is a variable capacity virtual volume in which a reserved volume is allocated or unallocated depending on transfer volume usage status. Accordingly, where an original transfer logical volume has a storage capacity of 0-2700, by allocating a reserved logical volume of capacity V, capacity of the virtual transfer volume increases by an extent equivalent to the added capacity V. In this case, the write data area end address ADe will now indicate a location calculated by incrementing the location by an amount equivalent to capacity V.

On the other hand, when a reserved logical volume has been previously allocated by way of a virtual transfer volume, and the reserved logical volume is now unallocated, capacity of the virtual transfer volume decreases by an extent equivalent to the deducted capacity V. In this case, the write data area end address ADe will now indicate a location calculated by decrementing the location by an amount equivalent to capacity V.

Figure 12:
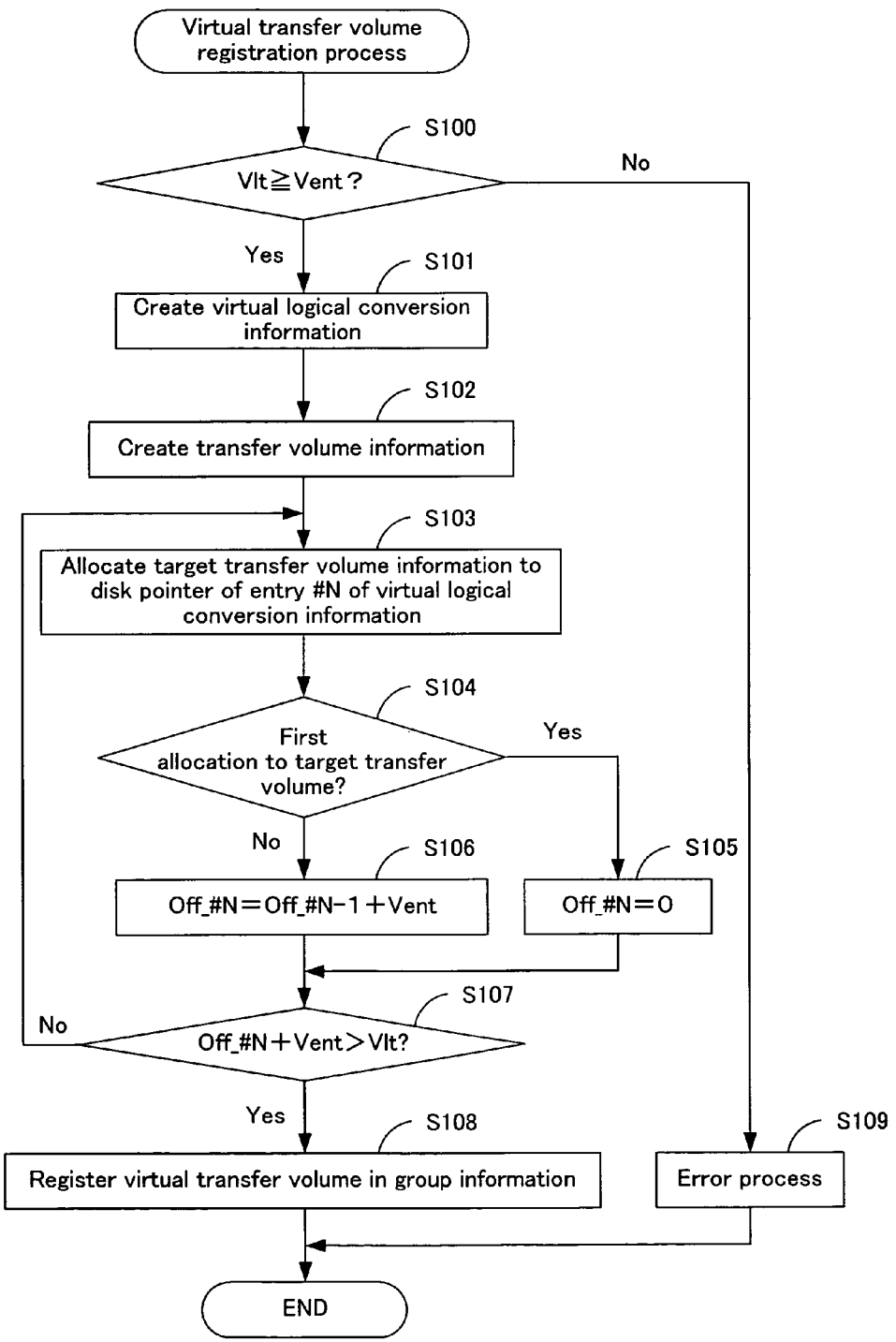
FIG. 12 is a flowchart showing the processing routine for a virtual transfer volume registration process executed in the embodiment.
Figure 13:
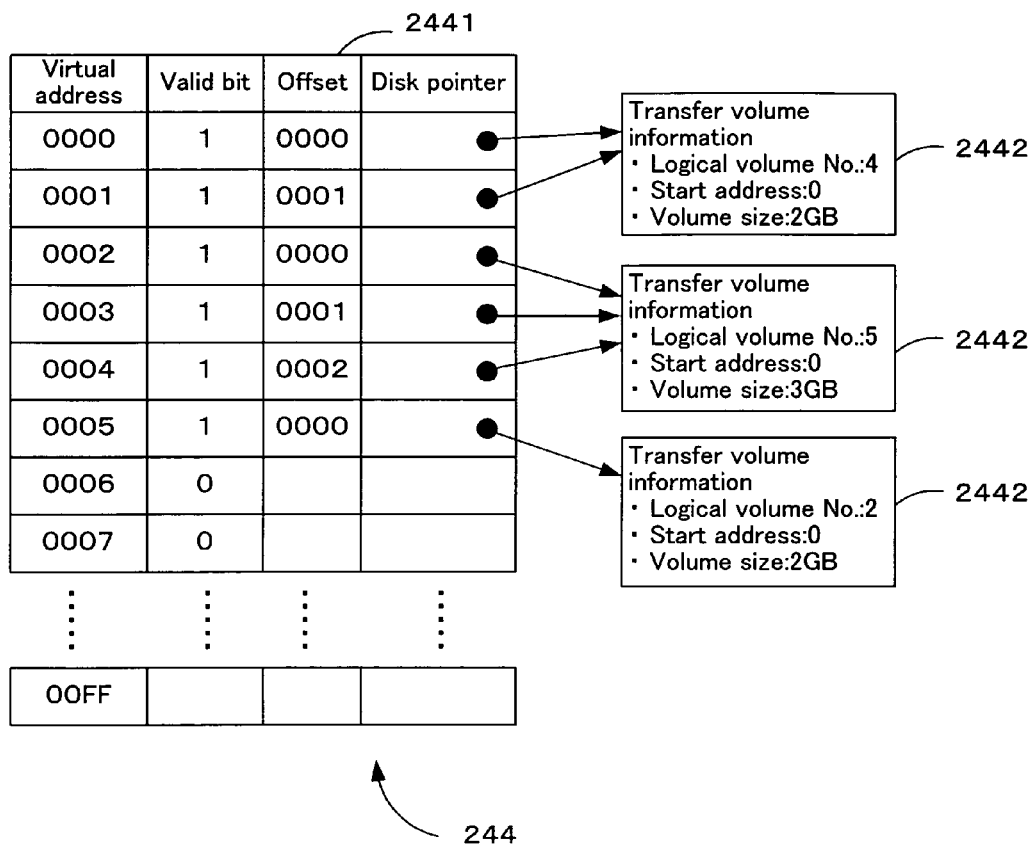
FIG. 13 is an illustration of an example of virtual logical address conversion information and logical volume information used in the embodiment.

The following description of a virtual transfer volume registration process makes reference to FIG. 12 and FIG. 13. FIG. 12 is a flowchart showing the processing routine for a virtual transfer volume registration process executed in the embodiment. FIG. 13 is an illustration of an example of virtual logical address conversion information and logical volume information used in the embodiment.

Prior to the virtual transfer volume registration process, a group creation process and a pair registration process are executed respectively. These processes are executed by the user, via the first host computer 10 or first console 51. A brief description follows.

In the group creation process, the status of an unused group indicated by the user in the first storage device 20 is changed to "normal" by the first host adaptor 21. The status of an unused group indicated by the user in the second storage device 40 is changed to "normal" by the second host adaptor 41 having received a group creation instruction from the first host adaptor 21.

The pair registration process is also initiated through user instruction via the first host computer 10 or first console 51. The first host computer 10 specifies information indicating data targeted for replication and information indicating a data replication destination, and issues a pair registration instruction to the first storage device 20. Information indicating data targeted for replication consists of the transfer group number of the data targeted for replication, and the first logical volume number. Information indicating data replication destination consists of the second storage device 40 holding the replicate data, the transfer group number, and the second logical volume number.

The first storage device 20 acquires from the pair information 242 a pair number of "unused" pair information, sets pair status to "unreplicated," to the first storage device number the first storage device number indicating the first storage device 20, and the first logical volume number indicated by the first logical volume number. The first storage device 20 also sets the second storage device number indicated by the second storage device number, the second logical volume number indicated by the second logical volume number, and the group number indicated by the group number. The first storage device 20 appends the acquired pair number to the pair set of the group information of the indicated group number, and changes the volume status of the first logical volume number to "primary."

The first storage device 20 transmits to the second storage device 40 the first storage device number indicating the first storage device 20, the group number instructed by the user, the first logical volume number, and the second logical volume number. The second storage device 40 acquires an unused pair number from the pair information, sets pair status to "unreplicated," to the first storage device number, the first storage device number indicating the first storage device 20, and the first logical volume number indicated by the first logical volume number. The second storage device 40 sets to the second storage device number the second storage device number indicated by the second storage device number, the second logical volume number indicated by the second logical volume number, and the group number indicated by the group number.

The second storage device 40 appends the acquired pair number to the pair set of the group information of the indicated group number, and changes the volume status of the second logical volume number to "auxiliary." The above process is performed for all data targeted for replication. Registration of logical volumes in a group and establishment of logical volume pairs can be carried out separately.

The virtual transfer volume registration process is a process for the purpose of registering in transfer group TG a virtual transfer volume for use in holding transfer data (or transfer frames), when a user has issued an execute start instruction via the host computer 10 or console 51. It is a process executed on all transfer volumes that make up a virtual transfer volume.

When the user requests a virtual transfer volume registration process, the host computer 10 sends a virtual transfer volume registration instruction to the first storage device 20, whereupon a virtual transfer volume registration process is executed in the first storage device 20. The virtual transfer volume registration instruction includes the number of the transfer group which is the registration destination, and the number of the virtual transfer volume to be registered.

When a virtual transfer volume registration instruction is received, the host adaptor 21 (CPU 211) determines, of the transfer volumes which make up the virtual transfer volume, which ones currently have target transfer volume capacity Vlt equal to or greater than a predetermined capacity Vent (Step S100). If the host adaptor 21 determines that Vlt≧Vent (Step S100: Yes), it creates virtual logical conversion information 2441 (Step S101). Here, a certain capacity is allotted for entries in the virtual logical conversion information 2441, and the predetermined capacity Vent is equivalent to capacity allotted for the entries.

On the other hand, if the host adaptor 21 determines that Vlt<Vent (Step S100: No), it executes an error produces (Step S109) and terminates the processing routine. In this case, no area allocated a virtual address is present in the target transfer volume.

As shown in FIG. 13, virtual logical conversion information 2441 is information that includes a virtual address, valid bit, offset, and disk pointer. The virtual address assumes a value of, for example, from 0000 to 00FF; the valid bit indicates whether the virtual address is valid, 1 signifying that it is valid and 0 signifying that it is invalid. Offset is difference information indicating another entry conferred when a plurality of virtual addresses (entries) are allocated to a given transfer volume; a disk pointer is information pointing to the logical volume information corresponding to each entry.

The host adaptor 21 then creates transfer volume information 2442 (Step S102). As shown in FIG. 13, the transfer volume information 2442 includes the logical volume number of the transfer volume, the start address, and volume size. The host adaptor 21 allocates target transfer volume information to the disk pointer of entry #N in the transfer volume information 2442 (Step S103). Allocation of transfer volume information to a disk pointer is executed such that a transfer volume of a number having the same value as the virtual transfer volume number indicated by the virtual transfer volume registration instruction is allocated.

The host adaptor 21 then decides whether this is the first entry allocation to the target transfer volume (Step S104), and if it is determined to be the first (Step S104: Yes), sets to 0 the offset number Off_#N of the target entry in virtual logical conversion information 2441 (Step S105). If on the other hand, the host adaptor 21 determines that this is not the first entry allocation to the target transfer volume (Step S104: No), it sets to Off_#N−1+Vent the offset number Off_#N of the target entry in virtual logical conversion information 2441 (Step S106). That is, it imparts offset to the entry preceding by an amount equivalent to entry capacity.

Host adaptor 21 then decides whether a value, arrived at by adding entry capacity Vent to the entry #N offset Off_#N in the virtual logical conversion information 2441, exceeds the transfer volume capacity Vlt (Step S107). In the event that Off_#N+Vent>Vlt (Step S107: Yes), the host adaptor 21 registers the virtual transfer volume number indicated by the virtual transfer volume number of the group number indicated in the group information 243, changes the volume information of the corresponding logical volume volume information to "normal," and terminates the routine. On the other hand, in the event that Off_#N+Vent≦Vlt (Step S107: No), the host adaptor 21 moves to Step S103 and repeatedly executes the above process.

An analogous virtual transfer volume registration process is executed for the second storage device 40. To describe briefly, once the host adaptor 21 of the first storage device 20 receives a virtual transfer volume registration instruction from the host computer 10 to the second storage device 40, it transfers it to the first host adaptor 41 of the second storage device 40. The first host adaptor 41 then executes as described in the preceding flowchart.

When this routine is completed, there is formed a virtual logical address conversion table 244 in which virtual logical conversion information 2441 and logical volume information 2442 are associated with one another. Using this virtual logical address conversion table 244, it is possible to specify a logical address in each logical volume (transfer volume, reserved volume) by specifying a virtual address.

For example, if the virtual address (000201F2) is specified, the upper 2 bytes (0002) and the virtual address of the virtual logical address conversion table 244 are compared, and the matching entry is identified. In the example of FIG. 13, the entry of virtual address (0002) corresponds. Accordingly, transfer volume information of transfer volume number 5 is pointed to by a pointer, and the lower 2 bytes of the virtual address indicated by 0 (start address)+(0000) offset+(01F2) becomes the logical address.

Once the virtual transfer volume registration process has been completed for all transfer volumes that make up the virtual transfer volume, an initializing replication process is executed. Specifically, an initializing replication process is instructed by the user via the first host computer 10 or first console 51. The initializing replication instruction includes the transfer group number on which the data replication process is to be initiated; host adaptor 21 set the replicated address in the pair information to 0, for all pairs belonging to the indicated group. The host adaptor 21 then instructs the host adaptor 41 to begin a transfer frame read process and restore process, described later.

Figure 14:
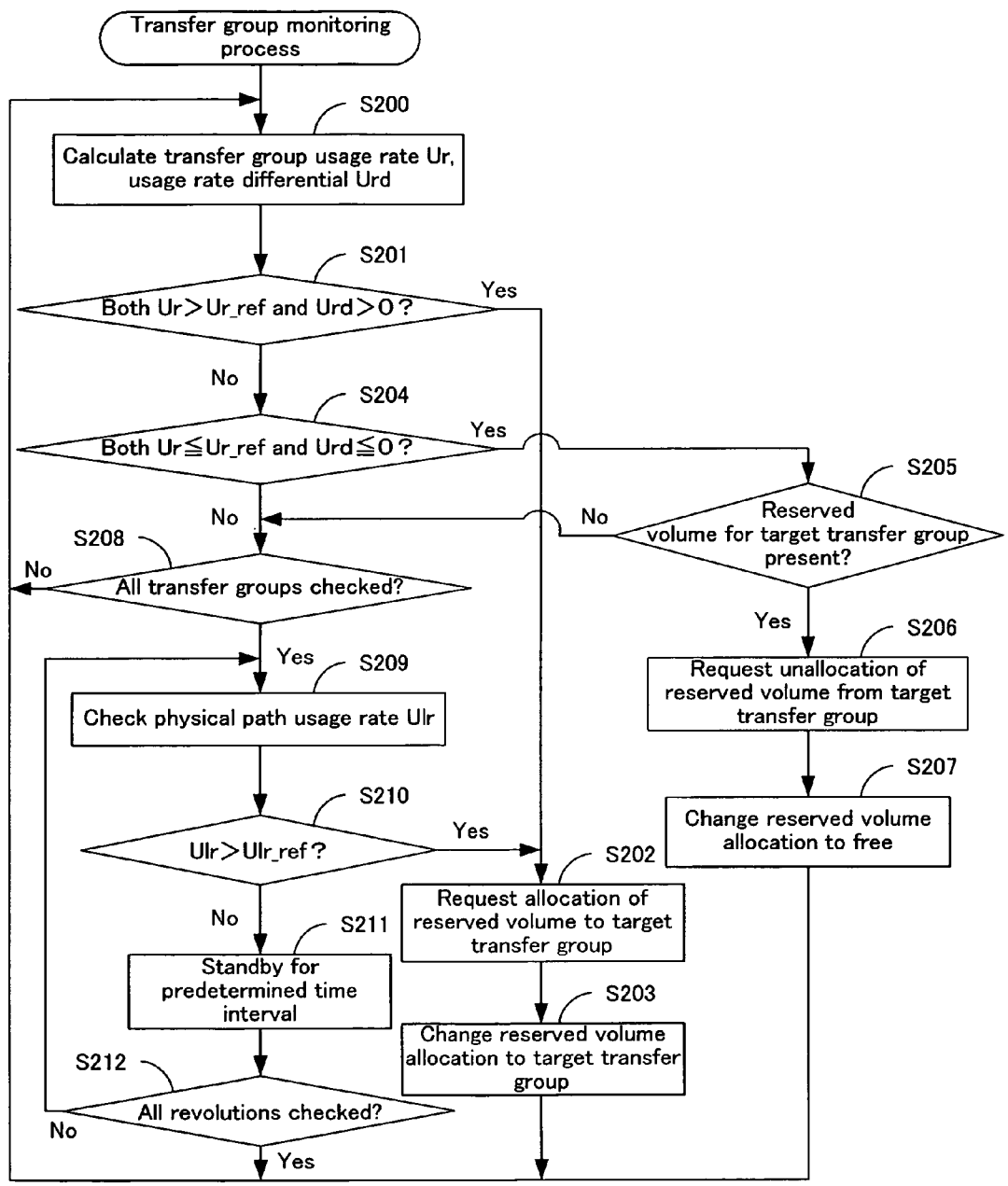
FIG. 14 is a flowchart showing the processing routine for a transfer group monitoring process executed by the host computer in the embodiment.

The following description of a transfer group monitoring process executed by host computer 10 makes reference to FIG. 14-FIG. 17. FIG. 14 is a flowchart showing the processing routine for a transfer group monitoring process executed by the host computer 10 in the embodiment. This process is a monitoring process executed for each transfer group, repeatedly at predetermined time intervals. FIG. 15 is an illustration of an example of usage rate information including the difference between usage rate and transfer group usage rate. FIG. 16 is an illustration of an example of reserved volume management information. FIG. 17 is an illustration of physical path usage rate information.

As shown in FIG. 14 or FIG. 15, the first host computer 100 (CPU 11) calculates a usage rate Ur and usage rate differential Urd for transfer group TG in the first storage device 20 (Step S200). Specifically, usage rate Ur and usage rate differential Urd are usage rates and usage rate differentials of virtual transfer volumes in each transfer group, and are calculated using Equations 1-3 below, respectively.

write data newest address ADn>write data oldest address ADo $$\text{usage rate } UR = \frac{(ADn - ADo)}{(ADe - ADs)} \qquad \text{Equation 1}$$

write data newest address ADn≦write data oldest address ADo $$\text{usage rate } UR = \frac{(ADe - ADs) + (ADn - ADo)}{(ADe - ADs)} \qquad \text{Equation 2}$$

usage rate differential Urd=previous usage rate Urp−current usage rate Urc  Equation 3

The first host computer 10 decides whether both Ur>predetermined value Ur_ref and whether Urd>0 (Step S201), and in the event it decides that both Ur>Ur_ref and Urd>0 (Step S201: Yes), issues to the first storage device 20 a request to allocate a reserved volume to the target transfer group (Step S202). Specifically, in the event that the usage rate Ur of a virtual transfer volume in the target transfer group exceeds a predetermined value Ur_ref, and the usage rate Ur differential (amount of variation) is positive, the first host computer 10 determines that the virtual transfer volume is in a saturated state, and requests to allocate a reserved volume.

The first host computer 10 then changes the allocation destination for the allocated reserved volume in the reserved volume management information 121 (Step S203) and moves to Step S200. As shown in FIG. 16, the reserved volume management information 121 includes reserved volume number, allocation destination group to which the reserved volume is allocated, and registration order. In the example of FIG. 16, reserved volume 1 and reserved volume 2 both belong to transfer group 1, with reserved volume 1 being registered prior to reserved volume 2.

In the event that the first host computer decides that it is not the case that Ur>Ur_ref and Urd>0 (Step S201: No), then decides whether Ur≦Ur_ref and Urd≦0 (Step S204). In the event that the first host computer 10 decides that Ur>Ur_ref and Urd>0 (Step S204: Yes), then determines whether there is a reserved volume in the target transfer group (Step S205). Specifically, in the event that the usage rate Uf of a virtual transfer volume in the target transfer group is equal to or less than predetermined value Ur_ref, and the usage rate Ur differential (amount of variation) is 0 or negative, the first host computer 10 determines that the virtual transfer volume is not in a saturated state. It then decides whether there is a previously allocated reserved volume.

In the event that the first host computer 10 determines that a reserved volume is present in the target transfer group (Step S205: Yes), it issues to the first storage device 20 a unallocation request requesting unallocation of the reserved volume from the target transfer volume, specifically, from the virtual transfer volume (Step S206). The first host computer 10 then changes the allocation of the unallocated reserved volume to "free" in the reserved volume management information 121 (Step S207), and moves to Step S200.

In the event that the first host computer 10 has decided that it is not the case that Ur>Ur_ref and Urd>0 (Step S204: No), and has decided that there is no reserved volume in the target transfer group (Step S205: No), then decides whether usage rate Ur and usage rate differential Urd have been calculated for all transfer groups (Step S208), and if these calculations have not been completed (Step S208: No), moves to Step S200 and repeats the process described above.

In the event that the first host computer 10 decides that usage rate Ur and usage rate differential Urd have been calculated for all transfer groups (Step S208: Yes), it calculates physical path usage rate Ulr on the storage device interconnect physical path 50 (Step S209). Physical path usage rate Ulr on the storage device interconnect physical path 50 is calculated by a known art method. Physical path usage rate Ulr is held, as shown in FIG. 17 for example, in the form of physical path usage rate information stored together with the numbers of the transfer groups using the physical path. In the example of FIG. 17, the storage device interconnect physical path 50 is duplexed, and two paths are provided. Path 2 is shared by transfer groups 2, 3.

The first host computer 10 decides whether the physical path usage rate Ulr is greater than a reference value Ulr_ref (Step S210), and in the event the first host computer 10 decides that Ulr>Ulr_ref (Step S210: Yes), then executes Steps S202, 203. While the physical path usage rate Ulr does not always indicate a saturated state in a transfer group at the current point in time, it may be used as one factor in the decision predicting whether a transfer group will subsequently reach saturation. That is, a large value for the physical path usage rate Ulr means that transfer of replicate data (transfer frames) from the first storage device 20 to the second storage device 40 will not proceed smoothly, making it likely that transfer frames will stack up in the transfer volume in the first storage device 20.

In the event that the first host computer 10 decides that Ulr≦Ulr_ref (Step S210: No), it goes into standby for a predetermined time interval (Step S211), and then decides whether physical path usage rates Ulr have been calculated for all physical paths (Step S212). In the event that the first host computer 10 has calculated physical path usage rates Ulr for all physical paths (Step S212: Yes), it moves to Step S200. In the event that the first host computer 10 has not calculated physical path usage rates Ulr for all physical paths (Step S212: No), it moves to Step S209, and calculates physical path usage rates Ulr for the other physical paths.

Figure 18:
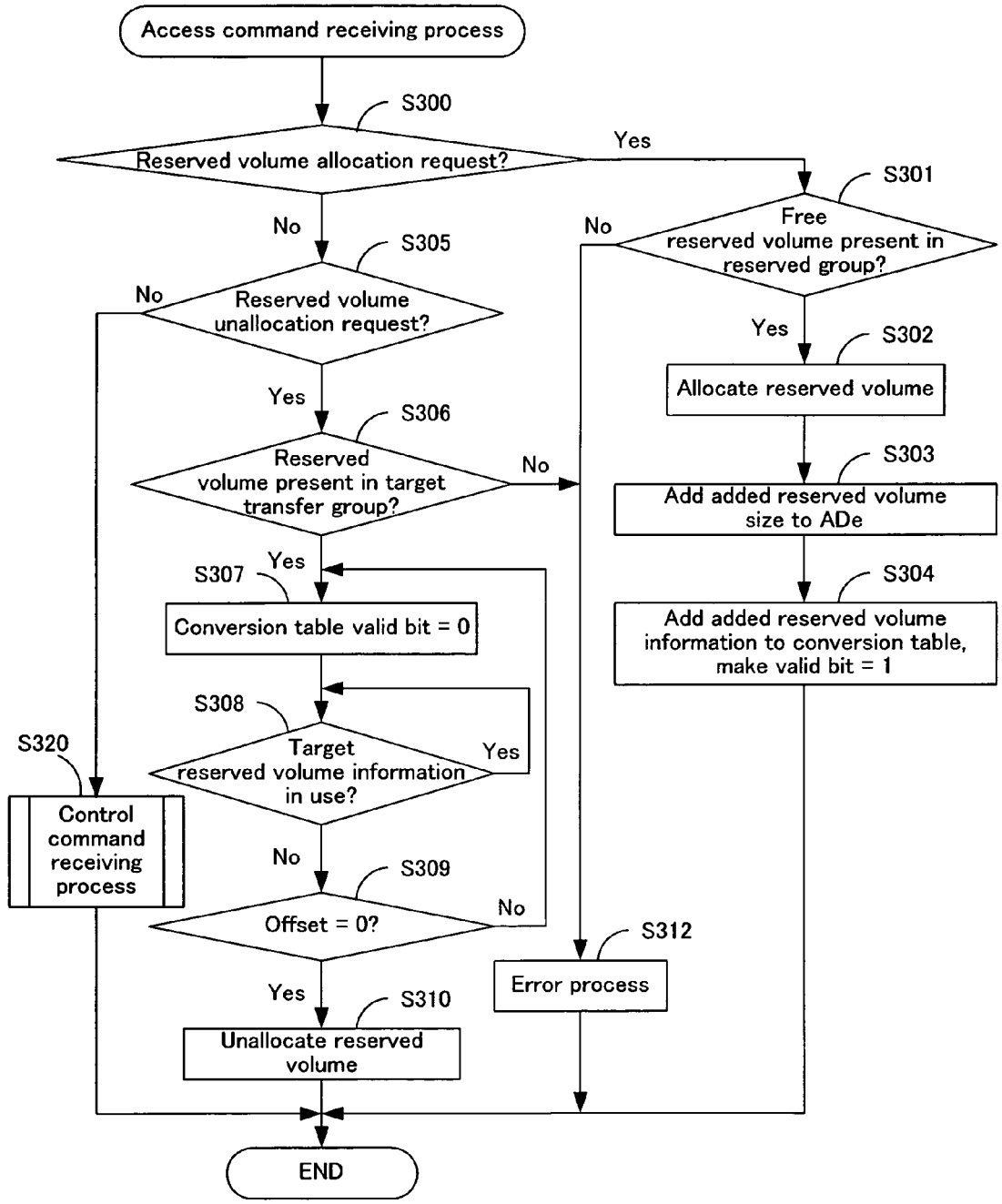
FIG. 18 is a flowchart showing the processing routine for an access command receiving process executed in the first storage device in the embodiment.

The following description of the process of allocating or unallocating a reserved volume, executed in the first storage device 20 in response to a request from the first host computer 10, makes reference to FIG. 18. The reserved volume allocation/unallocation process is executed as part of the access command receiving process from the first host computer 10. FIG. 18 is a flowchart showing the processing routine for an access command receiving process executed in the first storage device 20 the embodiment.

The first host adaptor 21 decides whether an access command received from the first host computer 10 is a reserved volume allocation request (Step S300). An access command includes a read, write, or reserved volume allocation/unallocation request command, a command target logical address, logical volume number, virtual address, and data amount. In the event that the first host adaptor 21 determines that a received access command is a reserved volume allocation request (Step S300: Yes), it then decides whether there is an open reserved volume in the reserved group (Step S301). In the event that the first host adaptor 21 decides that there is an open reserved volume in the reserved group (Step S301: Yes), it initiates allocation of a pre-registered reserved volume to the target transfer group TG (Step S302).

As shown in FIG. 11, the first host adaptor host adaptor 21 adds the capacity of the reserved volume to the write data area end address ADe in the virtual transfer volume to arrive at a new write data area end address ADe, increasing the capacity of the virtual transfer volume (Step S303). Next, the first host adaptor 21 adds the allocated reserved volume information by ways of transfer volume information to the virtual logical address conversion table, sets the valid bit to 1 (Step S304), and terminates the processing routine.

Figure 19A:
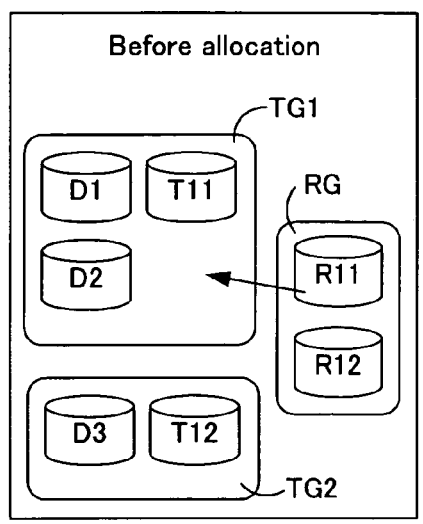
FIG. 19 is an illustration modeling allocation of a reserved volume to a transfer group.
Figure 19B:
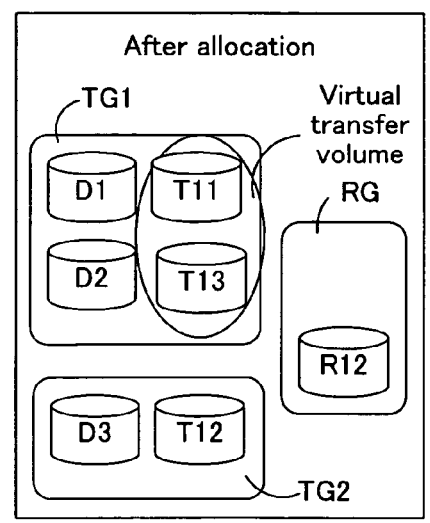

The following general description of reserved volume allocation makes reference to FIG. 19. FIG. 19 is an illustration modeling allocation of a reserved volume to a transfer group. Prior to allocation, one transfer volume T11 is present in transfer group TG1. Two reserved volumes R11, R12 are present in reserved group RG. When by means of a reserved volume allocation process, reserved volume R11 is allocated to transfer group TG1, a virtual transfer volume is formed by the transfer volume T11 and the allocated reserved volume R11 (T13). As a result, the capacity of the virtual transfer volume increases by the equivalent of the capacity of the reserved volume R11 (T13), so that more transfer frames can now be stored.

In the event that the first host adaptor 21 decides that the access command is not a reserved volume allocation request (Step S300: No), it then decides whether the access command is a reserved volume unallocation request (Step S305). In the event that the first host adaptor 21 decides that the access command is a reserved volume unallocation request (Step S305: Yes), it then decides whether there is a reserved volume in the corresponding transfer group (Step S306). In the event that the first host adaptor 21 decides that a reserved volume is present in the corresponding transfer group (Step S306: Yes), then sets the valid bit for the reserved volume targeted for unallocation to 0, in the virtual logical address conversion table 244. Specifically, the first host adaptor 21 designates the reserved volume targeted for unallocation as being invalid as a transfer volume. In the event that several reserved volumes are present in the corresponding transfer group, the reserved volume registered at the latest point in time is targeted.

The first host adaptor 21 then decides whether the targeted reserved volume information is in use (Step S308). If in use, the first host adaptor 21 stands by (Step S308: Yes). Specifically, the first host adaptor 21 decides whether the target reserved volume is being used as a transfer volume. Once the targeted reserved volume information is no longer in use (Step S308: No), the first host adaptor 21 decides whether offset of the targeted reserved volume is 0 (Step S309). In some instances, a targeted reserved volume may be pointed to by several disk pointers corresponding to several virtual addresses. Accordingly, the first host adaptor 21 stands by until use of targeted reserved volume information pointed to by the disk pointer having offset of 0 is finished, that is, until use of all targeted reserved volume information is finished.

In the event that the first host adaptor 21 decides that offset=0 (Step S309: Yes), then unallocates the target reserved volume (Step S310) and terminates the processing routine.

Specifically, as shown in FIG. 11, the first host adaptor 21 subtracts the capacity of the reserved volume that was appended from the write data area end address ADe, and designates this the new write data area end address ADe.

Figure 20A:
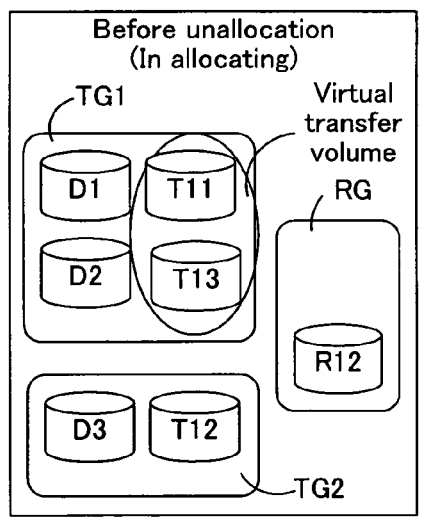
FIG. 20 is an illustration modeling unallocation of a reserved volume previously allocated to a transfer group.
Figure 20B:
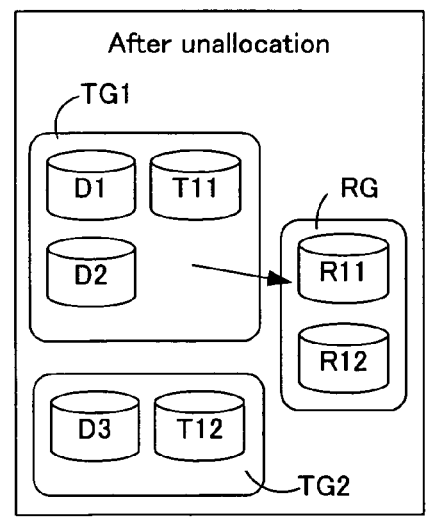

The following general description of reserved volume unallocation makes reference to FIG. 20. FIG. 20 is an illustration modeling unallocation of a reserved volume previously allocated to a transfer group. Prior to unallocation (i.e. while still allocated), transfer group TG1 includes a virtual transfer volume formed by transfer volume T11 and the reserved volume T13 (R11) allocated thereto. By means of the reserved volume unallocation process, reserved volume R11 is unallocated from transfer group R11, leaving only transfer volume T11 in transfer group TG1. As a result, the capacity of the virtual transfer volume decreases by the equivalent of the capacity of reserved volume R11 (T13).

In the event that the first host adaptor 21 decides that no reserved volume is present in the reserved group (Step S301: No) and that no allocated reserved volume is present in the corresponding transfer group (Step S306: No), since reserved volume allocation or unallocation cannot be executed, an error process is executed (Step S312), and the processing routine terminates. The error process could involve, for example, notifying the first console 51 or first host computer 10 that reserved volume allocation or unallocation cannot be executed.

In the event that the access command is neither a reserved volume allocation request nor a reserved volume unallocation request (Step S350: No), the host adaptor 21 executes a control command receiving process (Step S320) and terminates the processing routine.

Figure 21:
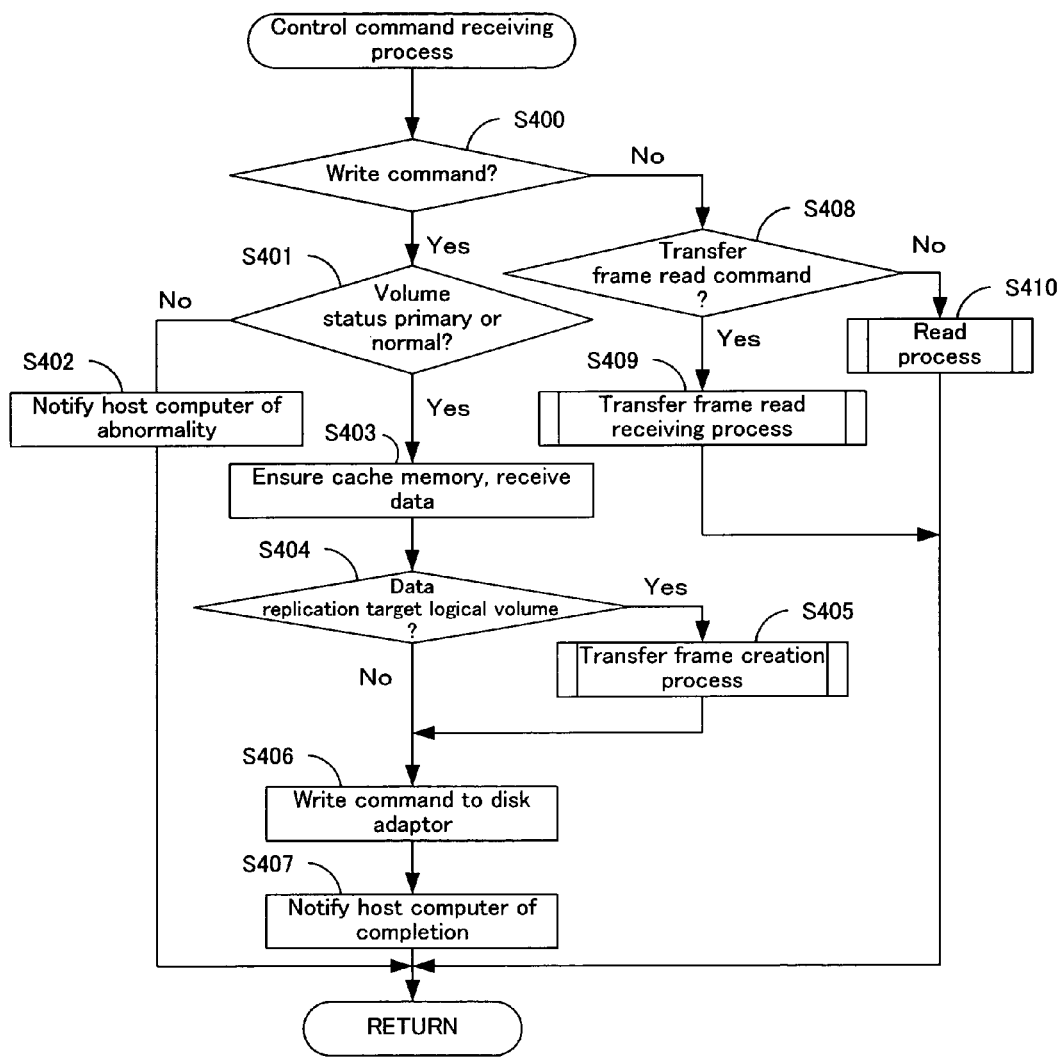
FIG. 21 is a flowchart showing the processing routine for a control command receiving process executed in the embodiment.

The following description of the control command receiving process makes reference to FIG. 21. FIG. 21 is a flowchart showing the processing routine for a control command receiving process executed in the embodiment. Following is a description using these, of the processing order in a case in which the first storage device 20 receives from the first host computer 10 a write command to a logical volume targeted for data replication.

The first host adaptor 21 of the first storage device 20 decides whether a received access command is a write command (Step S400), and in the event that it is a write command (Step S400: Yes), references the volume information for the data storage volume specified in the access command. In the event that volume status of the specified data storage volume is a status other than "normal" or "primary" (Step S401: No), since it is impossible to access the specified data storage volume, the host adaptor 21 notifies the first host computer 10 of abnormal termination (Step S402) and terminates the processing routine.

In the event that volume status of the specified data storage volume is "normal" or "primary" (Step S401: Yes), the first host adaptor 21 secures cache memory 23 and receives write data from the first host computer 10 (Step S403).

The first host adaptor 21 then decides whether the data storage volume specified by the access command is a data replication target logical volume, i.e. whether volume status is "primary" (Step S404). In the event that the first host adaptor 21 decides that the specified data storage volume is a data replication target logical volume (Step S404: Yes), then executes a transfer frame creation process described later (Step S405), and sends a write command to the disk adapter 25 (Step S406).

In the event that the first host adaptor 21 decides that the specified data storage volume is not a data replication target logical volume (Step S404: No), then sends a write command to the disk adapter 25 (Step S406).

The first host adaptor 20 then sends completion notification to the first host computer 10 (Step S407) and terminates the processing routine. Subsequently, the disk adapter 25 writes the write data to HDD 26, by means of a read/write process.

In the event that in Step S400, the first host adaptor 21 determines that the access command is not a write command (Step S400: No), then decides whether the access command is a transfer frame read command (Step S408). In the event that the first host adaptor 21 determines that the access command is a transfer frame read command (Step S408: Yes), then executes the transfer frame read process described later (Step S409), and terminates the processing routine.

If on the other hand the first host adaptor 21 determines that the access command is not a transfer frame read command (Step S408: No), then executes a read process (Step S410) and terminates the processing routine.

Figure 22:
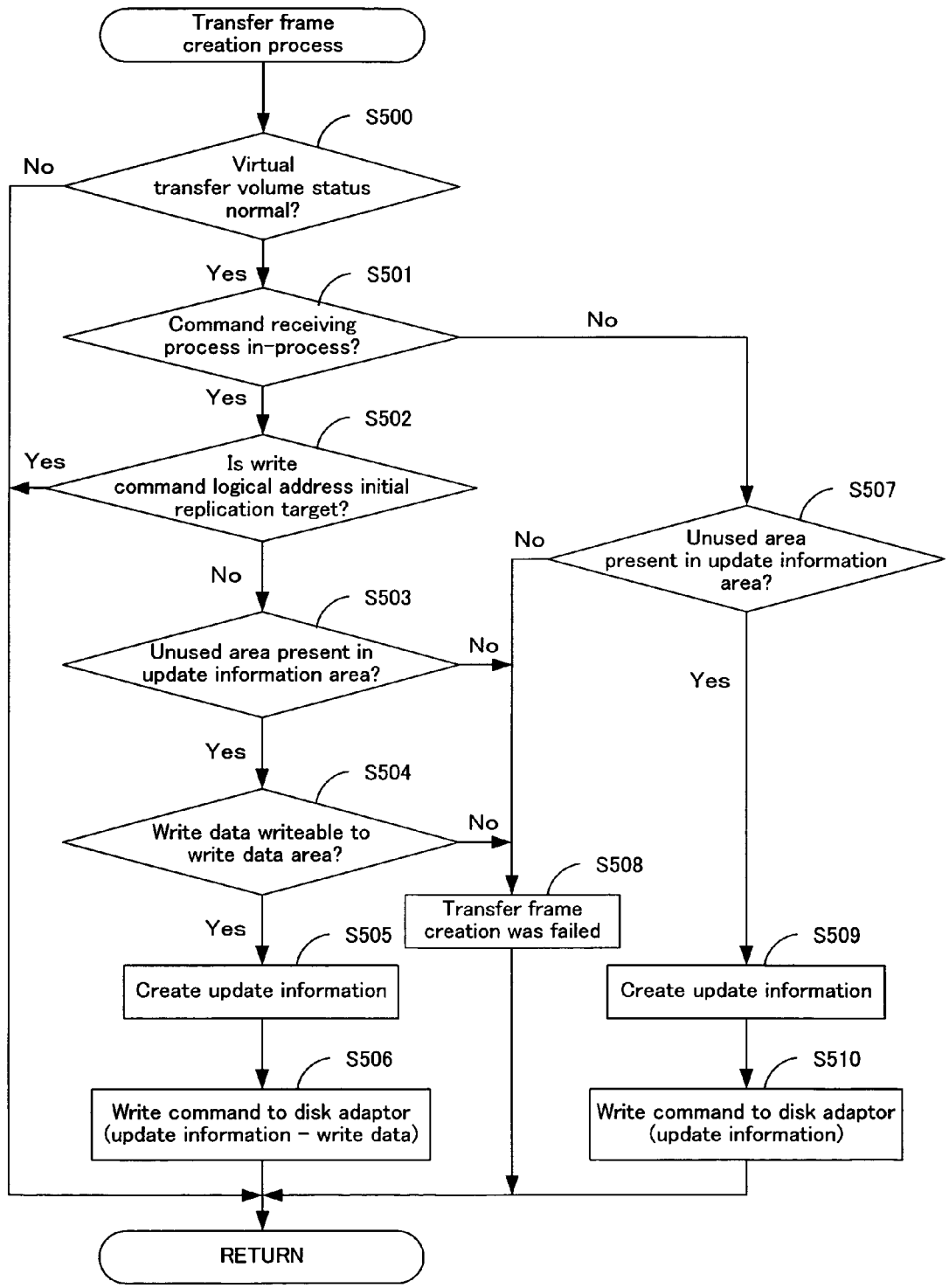
FIG. 22 is a flowchart showing the processing routine for a transfer frame creation process executed in the embodiment.

The following description of a transfer frame creation process makes reference to FIG. 22. FIG. 22 is a flowchart showing the processing routine for a transfer frame creation process executed in the embodiment. Following is a description using these, of the processing order in a case in which the first storage device 20 receives from the first host computer 10 a write command to a logical volume targeted for data replication.

The first host adaptor 21 decides whether volume status of the virtual transfer volume is "normal" (Step S500), and in the event that it is normal (Step S500: Yes) decides whether it is a transfer frame creation process originating from the access command (Step S501). In the event that the first host adaptor 21 decides that volume status of the virtual transfer volume is not "normal" (Step S500: No), since transfer frames cannot be stored in the virtual transfer volume, group status is changed to "abnormal," and the processing routine terminates. In this case, it will be preferable to change the virtual transfer volume (making up the transfer volume) to a normal logical volume.

In the event that the first host adaptor 21 decides that the current transfer frame creation process originates from the access command (Step S501: Yes), it then decides whether the logical address contained in the write command is the target for an initial replication process (Step S502). In the event that pair status of the data storage volume specified by the write commend is "unreplicated" or "replicating," a frame creation process is executed later by means of an initial replication process. Accordingly, in the event that the logical address contained in the write command is the target for an initial replication process (Step S502: Yes), no transfer frame is created at this point in time. In the event that the first host adaptor 21 decides that the logical address contained in the write command is not the target for an initial replication process, i.e. that pair status of the data storage volume specified by the write command is "normal" (Step S502: No), then decides whether an unused area is present in the update information area of the virtual transfer volume (Step S503). Specifically, the first host adaptor 21 refers to the pointer information 245, and in the event that the update information oldest address and the update information newest address match, decides that an unused area is present in the update information area of the virtual transfer volume.

In the event that the first host adaptor 21 decides that an unused area is present in the update information area of the virtual transfer volume (Step S503: Yes), then decides whether it is possible to store the write data in the write data area of the virtual transfer volume (Step S504). Specifically, the first host adaptor 21 refers to the pointer information 245, and if the sum of the write data newest address ADn and the write data capacity is equal to or greater than the write data area end address ADe, decides that the write data cannot be written to the write data area of the virtual transfer volume.

In the event that the first host adaptor 21 decides that it is possible to store the write data in the write data area of the virtual transfer volume (Step S504: Yes), then acquires the logical address storing the update information and the logical address storing the write data, and creates update information (Step S505). Specifically, the first host adaptor 21 acquires the current update number from the group information 243 for the target transfer group, adds 1, and establishes this value as the update number in the group information 243. Also, the value obtained by adding the update information capacity to the current update information newest address is established as the update information newest address of the pointer information 245. Additionally, the value obtained by adding the write data capacity to the current write data newest address ADn is established as the write data newest address ADn in the pointer information 245. The first host adaptor 21 creates the update information using these numerical values, the group number, etc.

The first host adaptor 21 sends the disk adaptor 25 a write command containing the update information and write data (Step S506), and terminates the processing routine.

In the event that the first host adaptor 21 decides that the current transfer frame creation process does not originate from the access command, i.e. it originates from the initial replication process (Step S501: No), then decides whether an unused area is present in the update information area of the virtual transfer volume (Step S509).

In the event that the first host adaptor 21 decides that an unused area is present in the update information area of the virtual transfer volume (Step S507: Yes), then acquires the logical address storing the update information, and creates update information (Step S509). The first host adaptor 21 then sends the disk adaptor 25 a write command containing the update information (Step S510), and terminates the processing routine.

In the event that the first host adaptor 21 decides that an unused area is not present in the update information area of the virtual transfer volume (Step S507: No), then designates a transfer frame creation a failure (Step S508), and terminates the processing routine.

Figure 23:
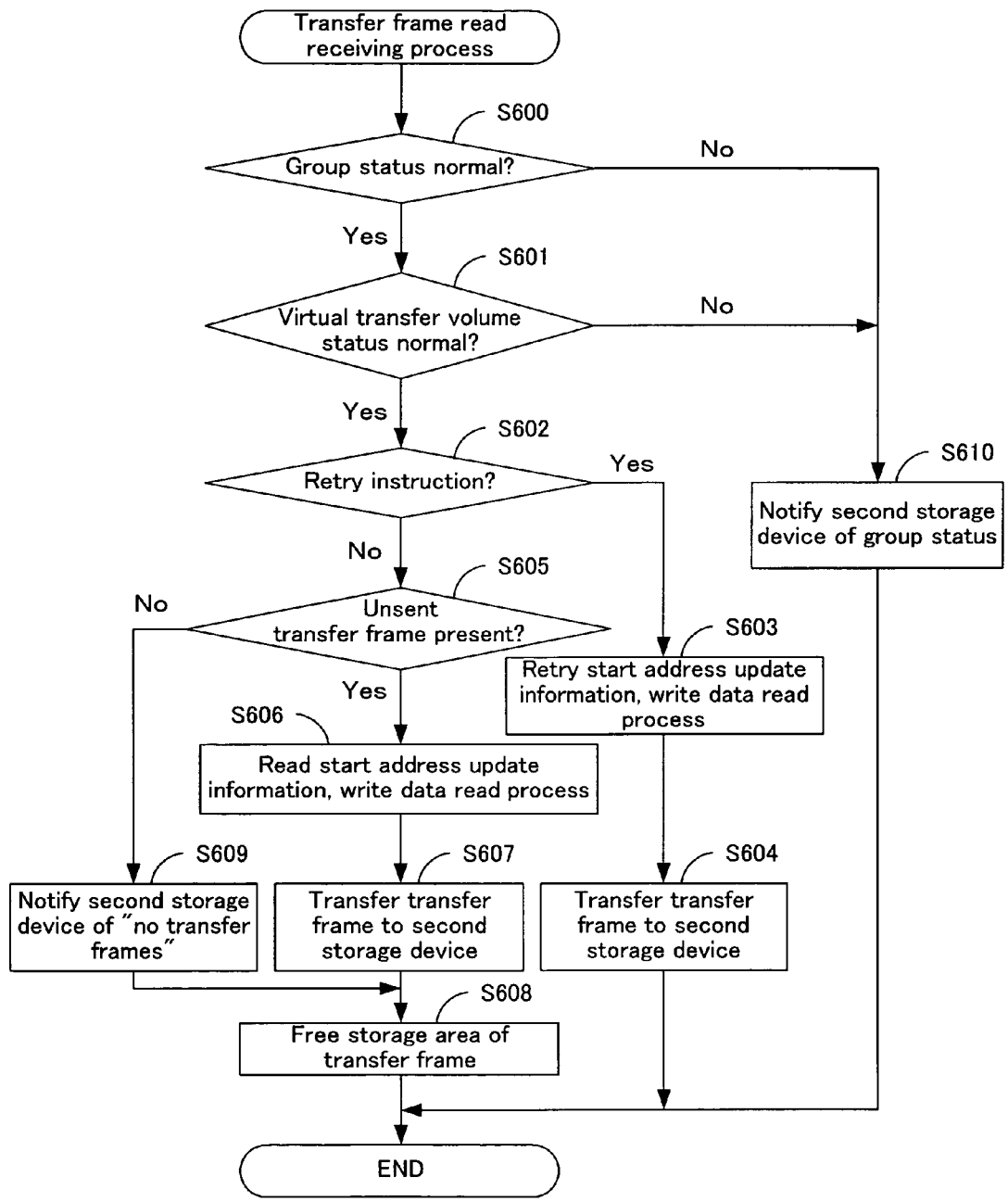
FIG. 23 is a flowchart showing the processing routine for a transfer frame read process executed in the embodiment.

The following description of a transfer frame read process makes reference to FIG. 23. FIG. 23 is a flowchart showing the processing routine for a transfer frame read process executed in the embodiment. Following is a description using these, of the processing order in a case in which the first storage device 20 receives from the second storage device 40 a transfer frame read command. The transfer frame read command includes an identifier the command as a transfer frame read command, number of the transfer group targeted by the command, and retry instruction status.

Upon receiving a transfer frame read command from the second storage device, the first host adaptor 21 decides whether the status of the transfer group is normal (Step S600). In the event that the status of the target transfer group is not "normal", i.e. indicates "failure" (Step S600: No), the first host adaptor 21 notifies the second storage device 40 of the status of the targeted transfer group (Step S610), and terminates the processing routine. The second storage device 40 executes a routine according to the received group status. For example, in the event that group status indicates "failure" the transfer frame read process is terminated.

In the event that the first host adaptor 21 decides that transfer group status is normal (Step S600: Yes), then decides whether volume status of the virtual transfer volume is "normal" (Step S601). In the event that it is normal (Step S601:

Yes), the first host adaptor 21 then decides whether the transfer frame read command is a retry instruction (Step S602).

In the event that volume status of the virtual transfer volume is not "normal" (Step S601: No), the first host adaptor 21 changes the group status to "abnormal", notifies the second storage device 40 of the status of the virtual transfer volume (Step S610), and terminates the processing routine. The second storage device 40 executes a routine according to the received volume status. For example, in the event that volume status indicates "abnormal" the transfer frame read process is terminated.

In the event that the transfer frame read command is a retry instruction (Step S602: Yes), the first host adaptor 21 resends the previously sent transfer frame to the second storage device 40. The first host adaptor 21 then reads the retry start address update information and write data via the disk adaptor 25 (Step S603), sends to the second storage device 40 a transfer frame that includes the read update information and write data (Step S604), and terminates the processing routine.

In the event that the transfer frame read command is not a retry instruction (Step S602: No), the first host adaptor 21 decides whether an unsent transfer frame is present (Step S605). Specifically, the first host adaptor 21 compares the read start address in the pointer information 245 with the update information newest address, and in the event that the two addresses are equivalent, concludes that all transfer frames have been transferred to the second storage device 40.

In the event that an unsent transfer frame is present (Step S605: Yes), the first host adaptor 21 reads the read start address update information and write data via the disk adaptor 25 (Step S606), and sends to the second storage device 40 a transfer frame that includes the read update information and write data (Step S607). The first host adaptor 21 then establishes the read start address as the retry start address of the pointer information 245, and establishes a value having the capacity of the sent update information added thereto as the read start address.

The first host adaptor 21 now releases the storage area of the virtual transfer volume in which was stored the transfer frame sent to the second storage device 40 at the time of processing the previous transfer frame read command (Step S608), and terminates the processing routine. The process of releasing the storage area in the virtual transfer volume is executed as described hereinbelow. First, the update information oldest address of the pointer information 245 is established as the retry start address. In the event that the update information oldest address matches the retry data area lead address ADs, the update information oldest address goes to 0. The write data oldest address ADo is changed to a value obtained by adding the data capacity of the write data sent in respond to the previous transfer frame read comment. In the embodiment, virtual transfer volume capacity can be increased or decreased depending on virtual transfer volume usage status, so as a general rule the logical address never goes above the capacity of the virtual transfer volume.

In the event that no unsent transfer frame is present (Step S605: No), since all transfer frames have now been sent to the second storage device 40, the first host adaptor 21 notifies the second storage device 40 that there are "no transfer frames" (Step S609). The first host adaptor 21 then releases the transfer frame storage area (Step S608), and terminates the processing routine.

It then reads the read start address update information and write data via the disk adaptor 25 (Step S606), and sends to the second storage device 40 a transfer frame that includes the read update information and write data (Step S607). The first host adaptor 21 then establishes the read start address as the retry start address of the pointer information 245, and establishes a value having the capacity of the sent update information added thereto as the read start address.

The first host adaptor 21 now releases the storage area of the virtual transfer volume in which was stored the transfer frame sent to the second storage device 40 at the time of processing the previous transfer frame read command (Step S608), and terminates the processing routine.

Figure 24:
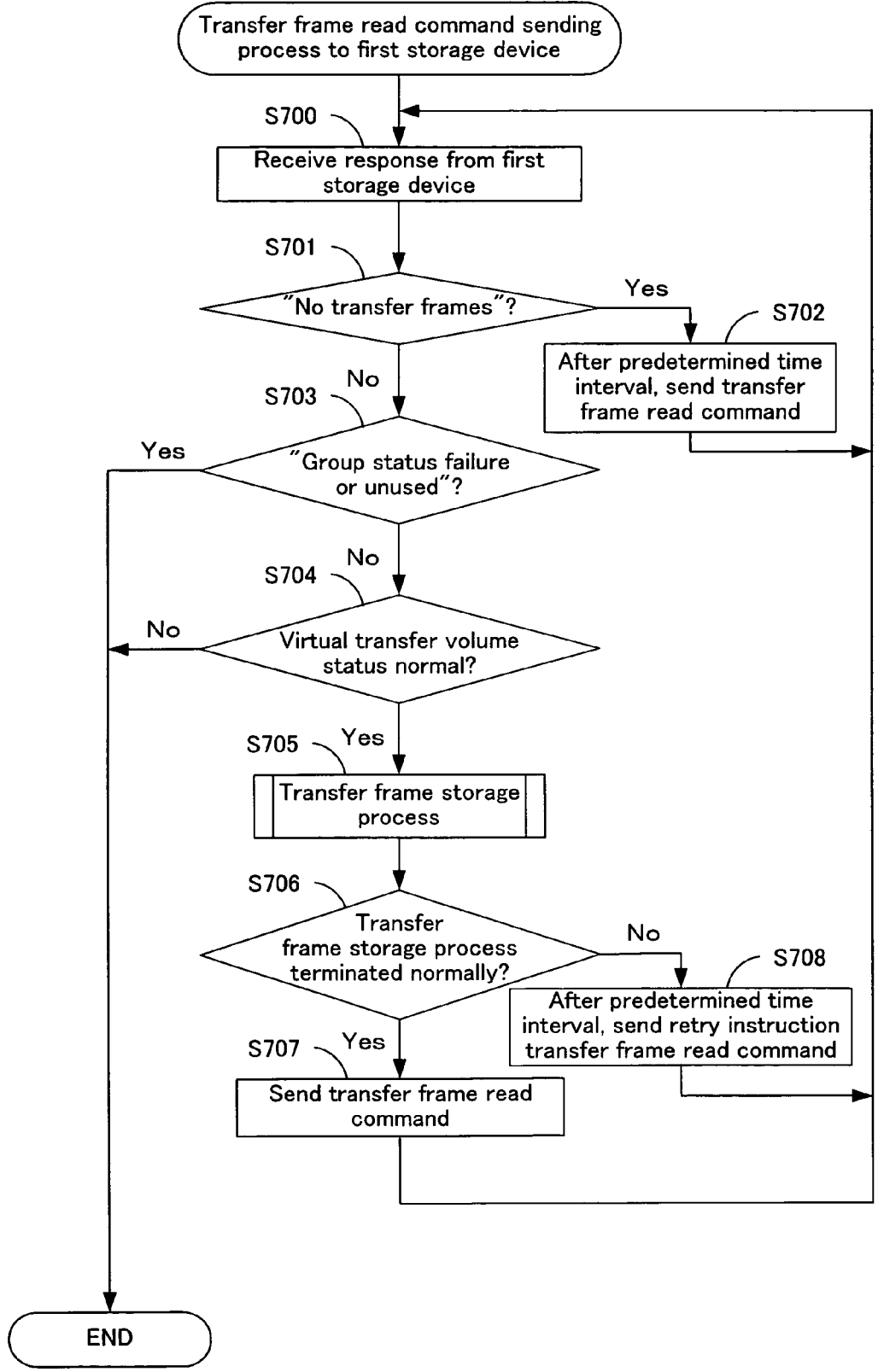
FIG. 24 is a flowchart showing the processing routine for a transfer frame read command transmission process executed in the embodiment.

The following description of a transfer frame read command transmission process to the first storage device 20 makes reference to FIG. 24. FIG. 24 is a flowchart showing the processing routine for a transfer frame read command transmission process executed in the embodiment. Following is a description using these, of the processing order in a case in which a transfer frame is read from the first storage device 20 and stored in a virtual transfer volume.

The first host adaptor 41 in the second storage device 40 receives a response to the transfer frame read command sent to the first storage device 20 (Step S700). In the event that the response is "no transfer frames" (Step S701: Yes), the first host adaptor 41, after a predetermined time interval, resends a transfer frame read commend to the first storage device 20 (Step S702), and moves to Step S700. Since no transfer frame is currently present in the specified transfer group, it stands by.

In the event that the response is not "no transfer frames" (Step S701: No), the first host adaptor 41 decides whether the response is that the "status of specified transfer group is failure or unused" (Step S703). In the event that the response is that the "status of specified transfer group is failure or unused" (Step S703: Yes), since the transfer frame cannot be received, the first host adaptor 41 terminates the processing routine.

In the event that the response is not that the "status of specified transfer group is failure or unused" (Step S703: No), the first host adaptor 41 decides from the response whether the status of the virtual transfer volume is normal (Step S704). The first host adaptor 41 decides whether the status of the virtual transfer volume is normal (Step S704).

In the event that the status of the virtual transfer volume is not normal, i.e. abnormal (Step S704: No), since the transfer frame cannot be stored in the virtual logical volume, the first host adaptor 41 terminates the processing routine. In this instance, it will be preferable to change the virtual transfer volume (making up the transfer volume) to a normal logical volume.

In the event that the status of the virtual transfer volume is normal (Step S704: Yes), the transfer frame storage process described later is executed (Step S705). In the event that the transfer frame storage process terminates normally (Step S706: Yes), the first host adaptor 41 sends a transfer frame read command to the first storage device 20 (Step S707), and moves to Step S700.

In the event that the transfer frame storage process does not terminate normally (Step S706: No), the first host adaptor 41, after a predetermined time interval, sends a retry instruction transfer frame read command to the first storage device 20 (Step S708) and moves to Step S700.

Figure 25:
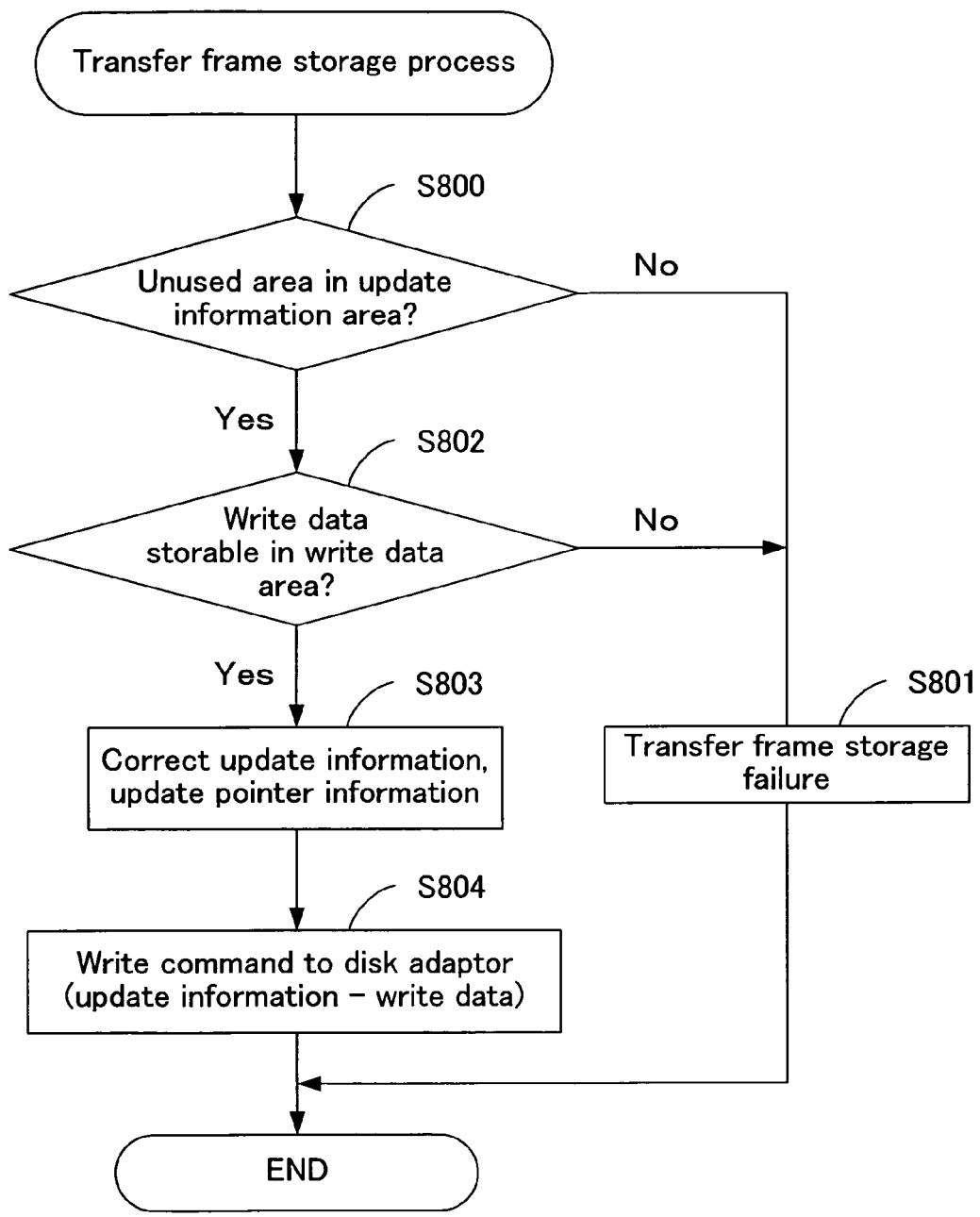
FIG. 25 is a flowchart showing the processing routine for a transfer frame storage process executed in the embodiment.

The following description of a transfer frame storage process makes reference to FIG. 25. FIG. 25 is a flowchart showing the processing routine for a transfer frame storage process executed in the embodiment.

The first host adaptor 41, referring to the pointer information, decides whether an unused area is present in the update information area of the virtual transfer volume (Step S800), and in the event that no unused area is present in the update information area of the virtual transfer volume (Step S800:

No), deems transfer frame storage to have failed (Step S801) and terminates the processing routine.

In the event that an unused area is present in the update information area of the virtual transfer volume (Step S800: No), the first host adaptor 41, referring to the pointer information, decides whether the write data can be stored in the write data area (Step S802). In the event that the write data cannot be stored in the write data area (Step S802: No), the first host adaptor 41 deems transfer frame storage to have failed (Step S801) and terminates the processing routine.

In the event that write data is storable in the write data area (Step S802: Yes), the first host adaptor 41 executes correction of update information and updating of pointer information (Step S803). Specifically, the first host adaptor 41 changes the group number in the received update information to the group number in the second storage device 40, and changes the logical address of the virtual transfer volume to the write data newest address ADn in the pointer information. The first host adaptor 41 also changes the update information newest address in the pointer information to a value derived by adding update information capacity to the current update information newest address, and changes the write data newest address ADn to a value derived by adding the write data capacity to the current write data newest address ADn.

The first host adaptor 41 then issues an update information and write data write command to the disk adaptor 25 (Step S804) and terminates the processing routine.

Figure 26:
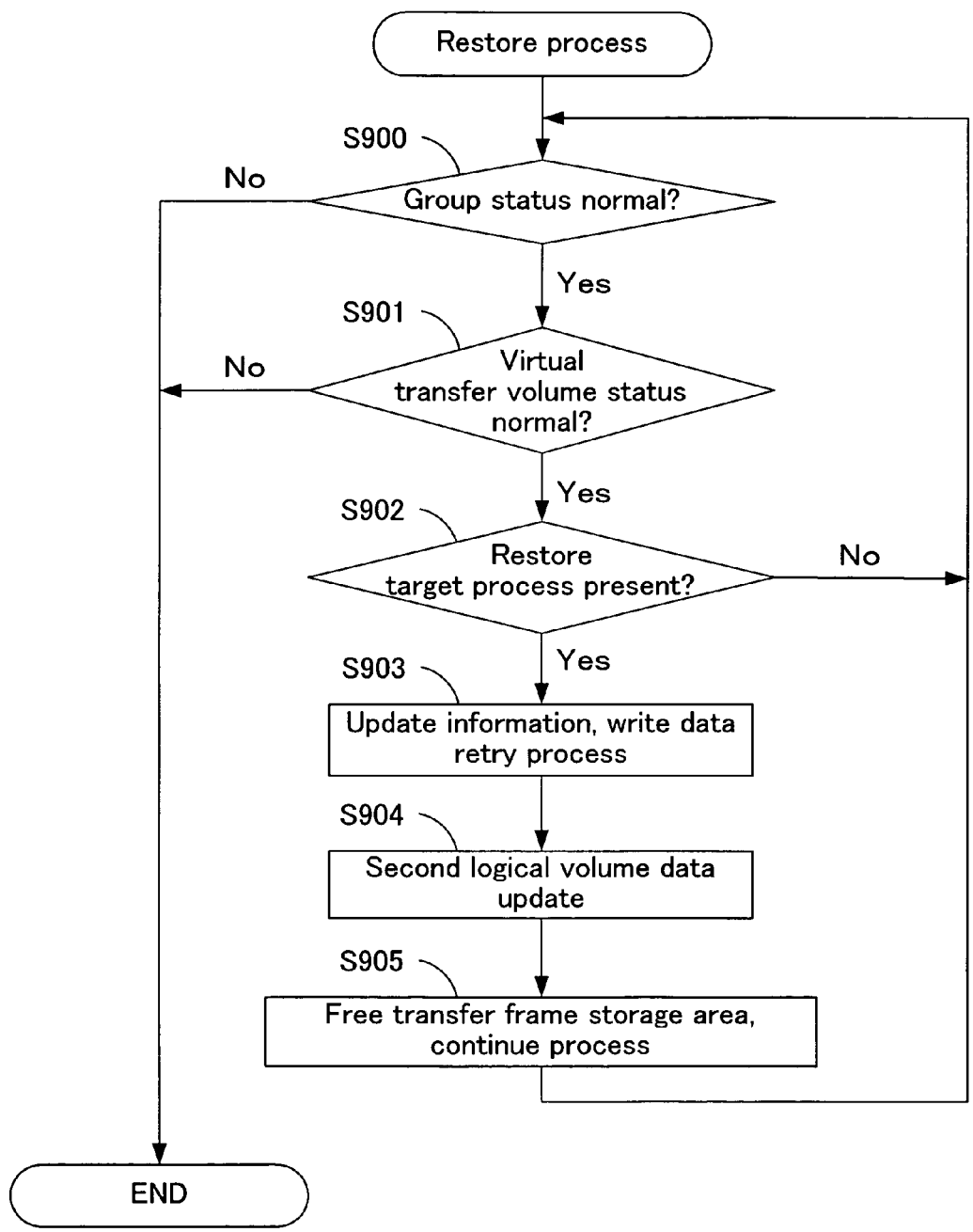
FIG. 26 is a flowchart showing the processing routine for a restore process executed in the embodiment.

The following description of a restore process makes reference to FIG. 26. FIG. 26 is a flowchart showing the processing routine for a restore process executed in the embodiment.

The first host adaptor 41 decides whether the group status of the targeted transfer group is "normal" (Step S900), and in the event that group status is not "normal," e.g. in the case of a failure (Step S900: No), terminates the processing routine.

In the event that the group status of the targeted transfer group is "normal" (Step S900: Yes), the first host adaptor 41 then decides whether the status of the virtual transfer volume is "normal" (Step S901). In the event that virtual transfer volume status is not "normal," e.g. in the case of abnormality (Step S901: No), the first host adaptor 41 designates group status "abnormal," and terminates the processing routine.

In the event that virtual transfer volume status is "normal" (Step S901: Yes), the first host adaptor 41 then decides whether there is a transfer frame to be restored (Step S902). In the event that there is no transfer frame to be restored (Step S902: No), the first host adaptor 41 moves to Step S900.

In the event that there is a transfer frame to be restored (Step S902: Yes), the first host adaptor 41 reads the update information and write data via the disk adaptor 25 (Step S903). The first host adaptor 41 then issues a command to the disk adaptor 25 to update the data of the second logical volume (Step S904), frees up the storage area of the transfer frame (Step S905), and moves to Step S900. That is, the restore process continues.

As described hereinabove, according the computer system 100 which pertains to the embodiment, usage status of transfer groups (transfer volumes) in the first and second storage devices and the physical path usage rate on the storage device interconnect physical path 50 connecting the first storage device 20 and second storage device 40 are monitored, whereby the user can be notified before the fact, via the first and second consoles 51, 52, that a transfer volume is approaching saturation. Accordingly, failure in the computer system due to interrupted transfer of a transfer frame can be avoided, by taking countermeasures against saturation of transfer volumes.

Further, in the computer system 100 pertaining to the embodiment, a reserved volume can be allocated to a transfer volume depending on usage status of the transfer group and physical path usage rate on the storage device interconnect physical path 50, before the transfer volume reaches saturation. That is, transfer volumes can be made into a variable-capacity virtual transfer volume composed of several logical volumes. Accordingly, insufficient capacity of a transfer volume can be controlled or prevented. As a result, interrupted transfer of transfer frames due to insufficient capacity of a transfer volume can be prevented or controlled, whereby it becomes possible to prevent or control halting of the computer system or occurrence of a failure in the computer system.

Further, in the embodiment herein, transfer of transfer frames (replicate data) between the first and second storage devices 20, 40 takes place via storage device interconnect physical path 50, whereby data replication processes can be executed without affecting sending and receiving of data between the first host computer and first storage device 20.

Additionally, since a reserved volume belonging to a reserved group can be allocated and unallocated dynamically with respect to several transfer volumes, it is possible to achieve efficient transfer of transfer frames with minimum volume resources in the storage devices.

Other Embodiments

In the embodiment hereinabove, the virtual transfer volume monitoring process is executed by the first host computer 10, but could instead be executed by the first storage device 20. In this case, it becomes possible to free the first host computer 10 from the virtual transfer volume monitoring process, so that the efficiency of application execution processes requested of the first host computer 10 can be improved.

In the embodiment hereinabove, the description centers on the reserved volume allocation/unallocation process in the first storage device 20; of course, reserved volume allocation/unallocation processes on transfer groups are executed analogously in the second storage device 40 as well. In the second storage device 40, a transfer frame transferred from the first storage device 20 is first stored in a transfer volume, so if there are not enough transfer volumes, transfer of the transfer frame will be interrupted. Accordingly, in such a case, by allocating a reserved volume to the transfer volume having insufficient capacity, interruption of transfer of the transfer frame can be controlled or prevented. Additionally, since replicate data of data stored in the first storage device is transferred to the second storage device 40, it is possible to achieve fail over by executing a restore process with respect to the data already transferred to a transfer volume in the second storage device 40, even in the event of a failure or data loss in the first storage device.

In the embodiment hereinabove, the reserved volume allocation/unallocation process is executed by the first host adaptor 21, but the process could instead be executed by the disk adaptor 25.

Figure 27:
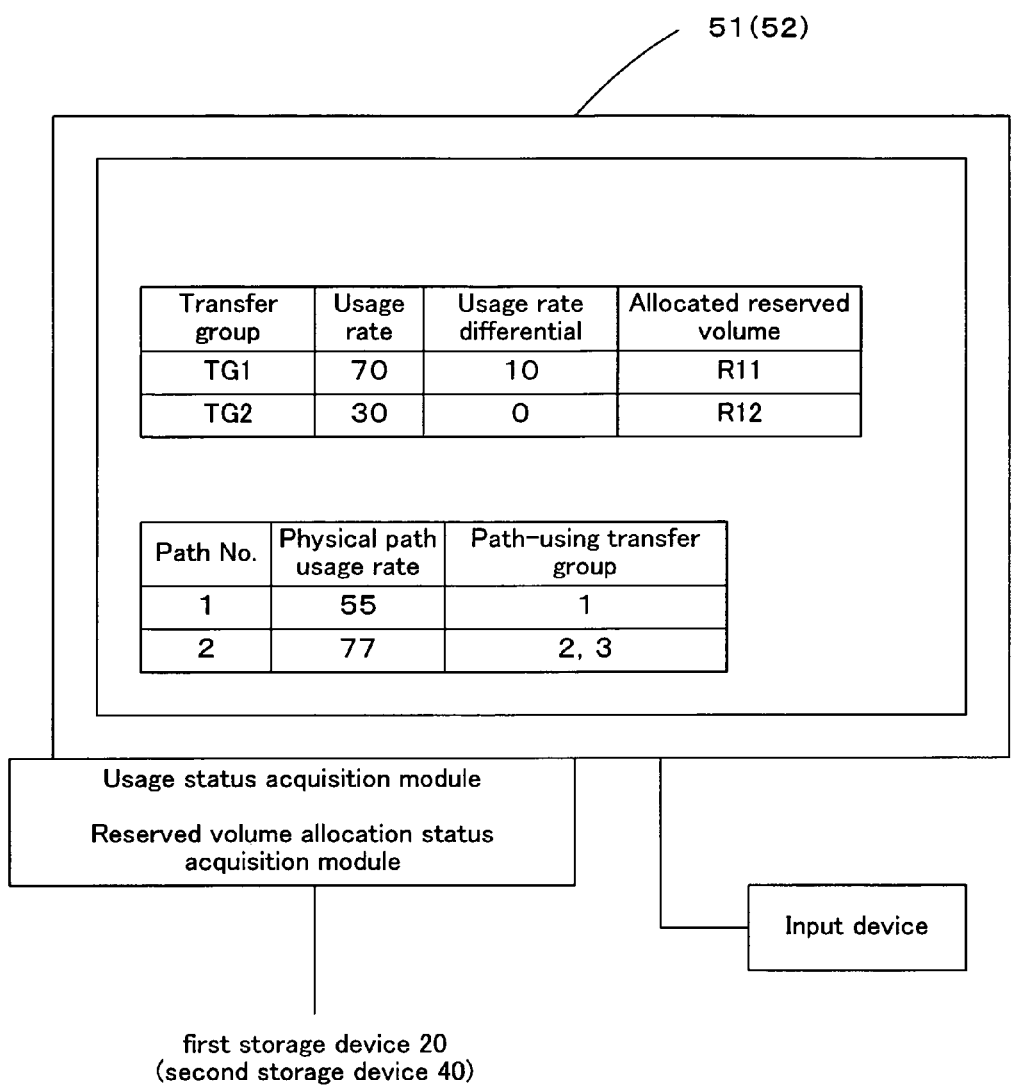
FIG. 27 is an illustration of an example of usage rate and physical path usage rate displayed on a console.

In the embodiment hereinabove, the first console 51 may display usage rate of transfer volumes (transfer groups TG) in the first storage device 10, usage rate differential, storage device interconnect physical path usage rate, and reserved volume allocation status, as shown in FIG. 27. By means of providing such an arrangement, it becomes possible for the user (administrator) to be aware of dynamic operating conditions of the computer system, and on the basis thereof to readily administer (e.g. add additional HDDs or rethink circuits) the storage system (storage devices).

Third and fourth storage devices may be provided in addition to the second storage device. In this case, the second storage device 40 may be provided with the modules provided to the first storage device 20, i.e., the transfer frame read process, transfer frame creation process, and access command receiving process.

In the embodiment hereinabove, the description centers on the reserved volume allocation/unallocation process in the first storage device 20; of course, reserved volume allocation/unallocation processes on transfer groups are executed analogously in the second storage device 40 as well. That is, transfer group TG usage rate in the second storage device 40 and physical path usage rate are monitored by the second host computer 30, with a request to allocate a reserved volume to transfer group TG in the event that usage rate or physical path usage rate goes above a predetermined value, or a request to unallocate a reserved volume to transfer group TG in the event that usage rate or physical path usage rate goes below a predetermined value. In response to a request to allocate or unallocate a reserved volume, the first host adaptor 41 of the second storage device 40 executes allocation/unallocation of reserved volumes with respect to transfer group TG. Transfer group TG usage rate and physical path usage rate may be monitored by the second storage device 40.

Furthermore, the first host computer 10 may send to the second storage device 40 via the first storage device 20, an instruction for allocating/unallocating of reserved volumes in the second storage devices 40. In the case, the first storage device 20 judges whether the instruction is a request for the second storage device 40 or not, and issues to the second storage device 40 the instruction of the first storage device 20 judges the instruction is a request for the second storage device 40.

Additionally, in the reserved volume allocation process in Step S202 in the embodiment hereinabove, a reserved volume may be allocated in consideration of physical structure(s) (such as HDD) of transfer volume(s) that is currently in use in a transfer group targeted for the allocation.

Figure 28:
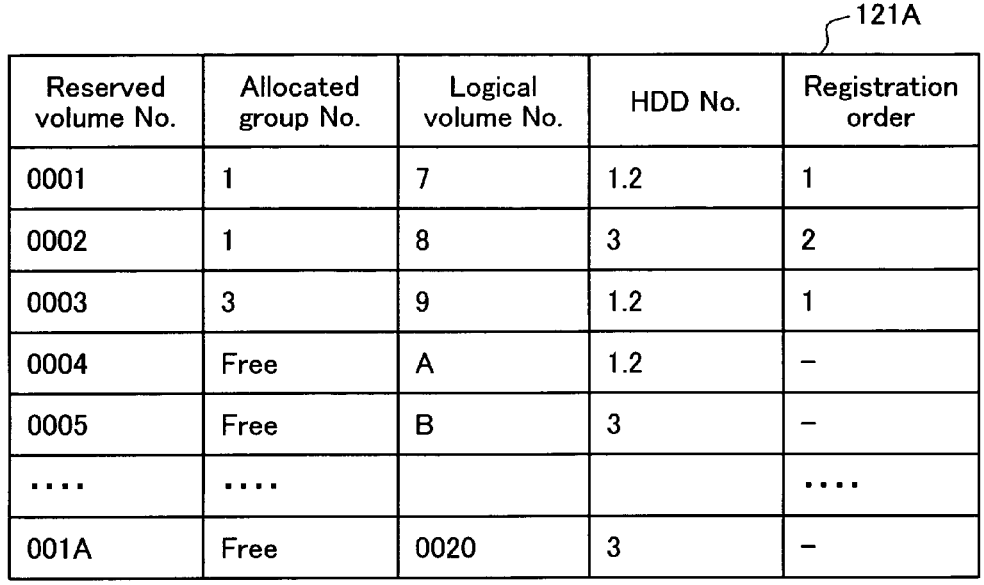
FIG. 28 is an illustration of reserved volume management information in which a physical structure of each volume is taken into consideration.

The memory 12 retains reserved volume management information 121A shown in FIG. 28. Logical volume number and HDD number are added to the reserved volume management information of FIG. 16 to give the reserved volume management information 121A of FIG. 28. The logical volume numbers are identifiers respectively attached to the logical volumes including data storage volumes, transfer volumes, replicate data storage volumes, and unallocated volumes. The HDD numbers indicate the types of HDD that comprise the respective logical volumes.

In the event that a reserved volume is allocated to a transfer group 3, the CPU 11 of the first host computer 10 extracts a reserved volume that has an allocation destination group number of 3 and acquires its HDD number from the reserved volume management information 121A shown in FIG. 28. As shown in FIG. 28, the reserved volume that is already allocated to the transfer group 3 has a reserved volume number of 3 and a HDD number of 1, 2. And then, from among those reserved volumes that have allocation destination volume numbers of "free", the CPU 11 extracts a reserved volume that is comprised of HDD, whose HDD number is different from the HDD number of the reserved volume that is already allocated to the transfer group 3. The CPU 11 then creates an allocation request to allocate the extracted reserved volume to the transfer group 3 and transmits the request to the first storage device 20. Since the reserved volume 0003 that is already registered to the transfer group 3 uses HDD of numbers 1, 2, a reserved volume 0004 that is comprised of the same HDD is considered competitive and therefore not allocated. Since a reserved volume 0005 has a HDD number of 3, which is different from the HDD number of the registered reserved volume, the CPU 11 creates an allocation request to allocate the reserved volume 0005. In this way, the plural transfer volumes that belong to one allocation destination group can have different physical structures one another. This enables parallel operation of HDD and therefore improves performance of the transfer volumes as a whole.

Figure 29:
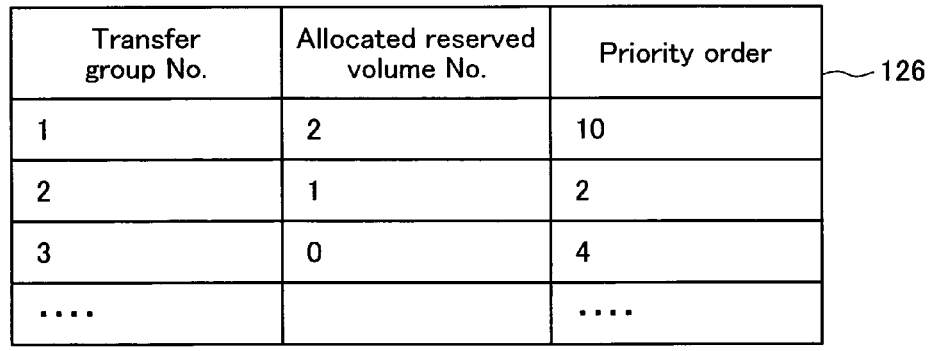
FIG. 29 is an illustration of transfer group priority control information.

An allocation priority control process may be added to the reserved volume allocation process. In this case, the number of reserved volumes in a reserved group is under management and in the event that the number of remaining reserved volumes goes below a predetermined value, the process shifts to a control process that preferentially allocates the remaining reserved volumes to those transfer groups with higher priorities. In order to set priority values to the reserved volume allocations mentioned above and to execute the priority control process, the memory 12 of the host computer 10 retains transfer group priority control information 126 shown in FIG. 29. As shown in FIG. 29, the transfer group priority control information 126 comprises transfer group number, number of allocated reserved volumes, and priority value. The larger the priority value, the more preferentially the transfer group is allocated with a reserved volume.

The CPU 11 refers to the priority control information 126 mentioned above and creates an allocation request to allocate a reserved volume to a transfer group of a largest priority value. The CPU 11 then creates an allocation request to allocate a reserved volume to a transfer group of a second largest priority value, and may continue with the reserved volume allocation process in the order of descending priorities of transfer groups, until no reserved volume remains unallocated. The CPU 11 may also determine the number or volume of reserved volume(s) to be allocated to each transfer group according to proportions of priority values of plural transfer groups targeted for allocation.

The CPU 11 refers to the priority control information 126 and in the event that a priority value of a transfer group goes below a predetermined value, the CPU 11 allocates no reserved volume to the transfer group. In the event that two or more transfer groups have a same priority value, the CPU 11 may create allocation requests such that any transfer group with less allocated reserved volume(s) would be given priority for the reserved volume allocation. The control process that sets priorities to reserved volume allocations includes, for example, allocating no reserved volume to any transfer group having a lower priority value than a specific value.

As described above, by controlling the allocation process in consideration of the shortage of reserved volume in the reserved group, it is possible to reduce influences on the primary service application program that operates on the host computer.

For example, a large priority value may be set for a volume related to main service application or mission critical. Accordingly, the storage system prevents interrupt of transferring data to the second storage device and the storage system provides fail over for the data related to the main service application or mission critical with data in the second storage device in the event of a failure or a data loss in the first storage device.

Figure 30:
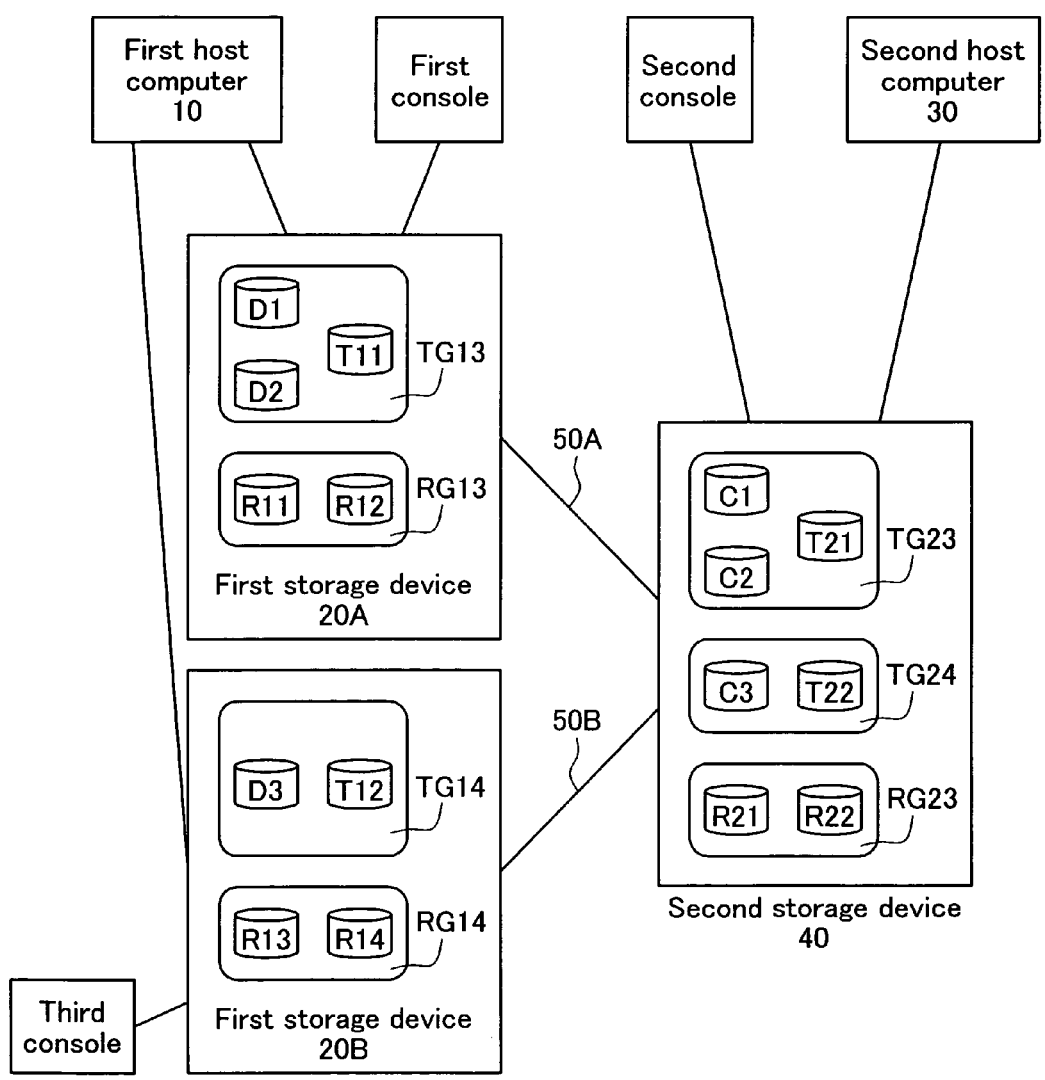
FIG. 30 is a block diagram showing an arrangement of a computer system that is different from the system shown in FIG. 1.

FIG. 30 shows a preferred example in which reserved volume allocation/unallocation process functions effectively in second storage devices 40. In the arrangement shown in FIG. 30, a plurality of first storage devices 20 are connected to a plurality of second storage devices 40 via storage device interconnect physical paths 50, and more particularly, a plurality of first storage devices 20A, 20B are connected to a single second storage device 40 via storage device interconnect physical paths 50A, 50B.

Similar to FIG. 1, the first storage device 20A includes a transfer volume T11, data volumes D1, D2, reserved volumes R11, R12, a transfer group TG13, and a reserved group RG13; whereas the first storage device 20B includes a transfer volume T12, a data volume D3, reserved volumes R13, R14, a transfer group TG14, and a reserved group RG14. The second storage device 40 includes transfer data storage volumes T21, T22, replicate data storage volumes C1, C2, C3, transfer groups TG23, TG24, and a reserved group RG23.

Let's suppose that the line speed of the storage device interconnect physical path 50A has been reduced in the arrangement shown in FIG. 30. This leads to differences between the amount of data transfer into the transfer group TG24 and the amount of data transfer into the transfer group TG23. As a result, the second storage device 40 receives the data transferred from the first storage device 20A with delay while receiving the data transferred from the first storage device 20B as usual. This results in continuous accumulation of received data in the transfer data storage volume T22. In particular, in a case in which the second storage device 40 secures the write order of data from the host computer 10, it is impossible to store the data accumulated in the transfer data storage volume T22 into the replicate data storage volume C3 independently of the reception of data transferred from the first storage devices 20. This leads to continuous accumulation of data in the transfer group TG24, and therefore requires allocation of the reserved volumes R21, R22. The reason that the data cannot be stored from the transfer data storage volume T22 into the replicate data storage volume C3 is that the write order relation (consistency) of data issued by the first host computer 10 remains unchanged among the data in C1, C2, and C3.

Another preferred example that is different from the example shown in FIG. 30 and in which reserved volume allocation/unallocation process functions effectively is a case in which new data volumes are added to those volumes targeted for data replication. In FIG. 1, let's suppose a data volume D4 is added to the transfer group TG11 and a replicate data storage volume C4 is added to the transfer group TG21. In this case, an initial replication process is executed between the data volume D4 and the replicate data storage volume C4, so that there arises a massive amount of data transfer from the first storage device 20 to the transfer data storage volume of the second storage device 40. In such a case, the storage device 40 adds a reserved volume to the transfer group TG22 and then executes the initial replication process. Since the data transfer from the first storage device 20 is often significantly reduced after the completion of the initial replication process, the storage device 40 then unallocates the reserved volume.

In the embodiment hereinabove, a virtual transfer volume is formed using reserved volumes that have been divided into groups in advance as reserved groups; however, if there are not enough reserved volumes, normal volumes may be moved to reserved volumes. In this case, a shortage of transfer volumes can be avoided, even if there are not enough reserved volumes.

In the embodiment hereinabove, the reserved volume allocation/unallocation processes are executed by means of software, specifically, in the form of a computer program; however, hardware circuitry provided with logical circuits for executing the aforementioned processes (steps) could be used instead. This reduces the load on the CPU, while enabling processes to be realized faster.

While the computer system and management method of a computer system pertaining to the invention have been shown and described on the basis of embodiments, the embodiment of the invention set forth hereinabove is merely intended to facilitate understanding of the invention, and implies no limitation thereof. Various modifications and improvements of the invention are possible without departing from the spirit and scope thereof as recited in the appended claims, and these will naturally be included as equivalents in the invention.

What is claimed is:

1. A computer system comprising:
   a host computer:
   a first storage device coupled to the host computer, and including a plurality of first hard disk drive (HDDs) configuring to a plurality of volumes;
   a second storage device coupled to the first storage device, and including a plurality of second HDDs configuring to a plurality of volumes, different from the plurality of volumes of the first storage device;
   wherein two or more of the plurality of volumes in the first storage device are configured to a plurality of primary logical volumes storing write data from the host computer, and another at least one of the plurality of volumes in the first storage device are configured to at least one of transfer volumes storing the write data with a update number of the write data and with information about addresses on the plurality of primary logical volumes updated by the write data;
   wherein the first storage device transfers the write data with the update number of the write data and with information about the addresses on the plurality of primary logical volumes updated by the write data, in the at least one of transfer volumes to the second storage device,
   wherein two or more of the plurality of volumes in the second storage device are configured to a plurality of auxiliary logical volumes, which store replication data of the plurality of primary logical volumes,
   wherein the second storage device updates the plurality of auxiliary logical volumes with retaining the update order using the write data, according to the transferred write data with the update number of the write data and with the information about the addresses on the plurality of primary logical volumes updated by the write data,
   wherein the host computer retains a transfer volume management information including HDD identifiers corresponding to the plurality of primary volumes and identifiers of the at least one of the transfer volumes,
   wherein, from the plurality of volumes in the first storage device, the host computer extracts an additional transfer volume, corresponding to HDD which is different from the HDD corresponded to the at least one of the transfer volumes, if the capacity usage of the at least one of the transfer volumes reaches or goes above a predetermined level,
   wherein the host computer transmits an allocation request about the additional transfer volume,
   wherein, after receiving the allocation request, the first storage device enables a parallel operation of an HDD corresponding to the additional transfer volume and an HDD corresponding to the at least one of transfer volumes for transfer of write data to the second storage device.

2. A computer system according to claim 1,
   wherein, after receiving the allocation request, the first storage device improves a performance of transfer write data to the second storage device, by effecting the parallel operation of HDD corresponding to the additional transfer volume and HDD corresponding to the at least one of transfer volumes for transfer of the host data to the second storage device.

3. A storage system comprising:

a first storage device coupled to a host computer, and including a plurality of first hard disk drive (HDDs) configuring to a plurality of volumes;

a second storage device coupled to the first storage device, and including a plurality of second HDDs configuring to a plurality of volumes, different from the plurality of volumes of the first storage device;

wherein two or more of the plurality of volumes in the first storage device are configured to a plurality of primary logical volumes storing write data from the host computer, and another at least one of the plurality of volumes in the first storage device are configured to at least one of transfer volumes storing the write data with a update number of the write data and with information both about addresses on the plurality of primary logical volumes updated by the write data and about addresses on the at least one of transfer volumes updated by the write data;

wherein the first storage device transfers the write data with the update number of the write data and with information about the addresses on the plurality of primary logical volumes updated by the write data, in the at least one of transfer volumes to the second storage device, wherein two or more of the plurality of volumes in the second storage device are configured to a plurality of auxiliary logical volumes, which store replication data of the plurality of primary logical volumes, wherein the second storage device updates the plurality of auxiliary logical volumes with retaining the update order using the write data, according to the transferred write data with the update number of the write data and with the information about the addresses on the plurality of primary logical volumes updated by the write data, wherein the first storage device receives an allocation request about an additional transfer volume, which is extracted from the plurality of volumes in the first storage device, and which corresponds to HDD different from the HDD corresponded to the at least one of the transfer volume, if the capacity usage of the at least one of the transfer volumes reaches or goes above a predetermined level, wherein, after receiving the allocation request, the first storage device enables a parallel operation of an HDD corresponding to the additional transfer volume and an HDD corresponding to the at least one of transfer volumes for transfer of write data to the second storage device.

4. A storage system according to claim 3, wherein, after receiving the allocation request, the first storage device improves a performance of transfer write data to the second storage device, by effecting the parallel operation of HDD corresponding to the additional transfer volume and HDD corresponding to the at least one of transfer volumes for transfer of the host data to the second storage device.

* * * * *

UNITED STATES PATENT AND TRADEMARK OFFICE
CERTIFICATE OF CORRECTION

PATENT NO. : 8,032,729 B2
APPLICATION NO. : 11/250367
DATED : October 4, 2011
INVENTOR(S) : Maki et al.

Page 1 of 1

It is certified that error appears in the above-identified patent and that said Letters Patent is hereby corrected as shown below:

Title page, Item (30), please amend as follows:

(30)    Foreign Application Priority Data

Apr. 28, 2005   (JP) ................................2005-130732
      May 11, 2004   (JP) ................................2004-140654

Please add Item (60) as follows:

--Related U.S. Application Data

(60)    This application is a CIP of 10/899,158, filed on July 27, 2004.--

Signed and Sealed this
Twenty-fifth Day of September, 2012

David J. Kappos
*Director of the United States Patent and Trademark Office*